United States Patent
Sankrithi et al.

(10) Patent No.: US 8,292,226 B2
(45) Date of Patent: Oct. 23, 2012

(54) WEIGHT-OPTIMIZING INTERNALLY PRESSURIZED COMPOSITE-BODY AIRCRAFT FUSELAGES HAVING NEAR-ELLIPTICAL CROSS SECTIONS

(75) Inventors: Mithra M. K. V. Sankrithi, Lake Forest Park, WA (US); Kevin Retz, Bothell, WA (US)

(73) Assignee: The Boeing Company, Chicago, IL (US)

( * ) Notice: Subject to any disclaimer, the term of this patent is extended or adjusted under 35 U.S.C. 154(b) by 665 days.

(21) Appl. No.: 12/624,322

(22) Filed: Nov. 23, 2009

(65) Prior Publication Data

US 2010/0200697 A1    Aug. 12, 2010

Related U.S. Application Data

(63) Continuation-in-part of application No. 11/273,966, filed on Nov. 15, 2005, now Pat. No. 7,621,482.

(51) Int. Cl.
*B64C 1/06* (2006.01)

(52) U.S. Cl. .................... 244/119; 244/117 R

(58) Field of Classification Search ............... D12/319, D12/337, 333, 343; 244/119, 120, 117 R, 244/36
See application file for complete search history.

(56) References Cited

U.S. PATENT DOCUMENTS

| | | | |
|---|---|---|---|
| 2,147,552 A | 2/1939 | Saives | |
| 2,314,949 A | 3/1943 | Palmer | |
| 2,412,778 A | 12/1946 | Kosek | |
| 3,854,679 A | 12/1974 | Smethers, Jr. | |
| 4,715,560 A | 12/1987 | Loyek | |
| 5,042,751 A | 8/1991 | Kolom | |
| 5,086,996 A * | 2/1992 | Roeder et al. | 244/119 |
| 6,098,922 A * | 8/2000 | Hahl | 244/36 |
| 6,834,833 B2 * | 12/2004 | Sankrithi | 244/119 |

* cited by examiner

*Primary Examiner* — Tien Dinh
(74) *Attorney, Agent, or Firm* — Haynes & Boone, LLP.

(57) ABSTRACT

A method for minimizing the weight of an internally pressurized aircraft fuselage of a type that includes an elongated tubular shell having a near-elliptical cross-section with a radius $R(\phi)$- and a curvature $Curv(\phi)$, where $\phi$ is a roll elevation angle of the shell, includes tailoring at least one structural attribute of the shell as a function of at least one of the elevation angle $\phi$, $R(\phi)$ and $Curv(\phi)$ so as to reduce the weight of the fuselage relative to an identical fuselage shell in which the same at least one structural attribute has not been so tailored.

27 Claims, 18 Drawing Sheets

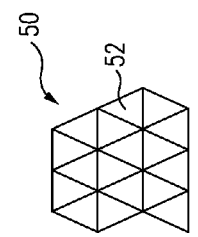
FIG. 5A
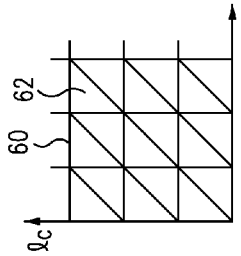
FIG. 5B
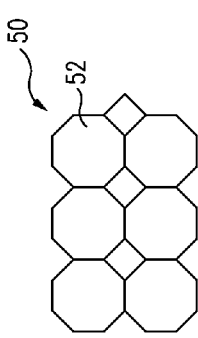
FIG. 5C
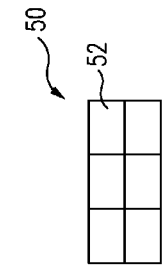
FIG. 5D
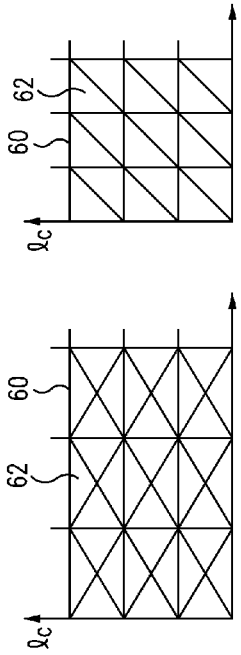
FIG. 6A
FIG. 6B
FIG. 6C
FIG. 6D
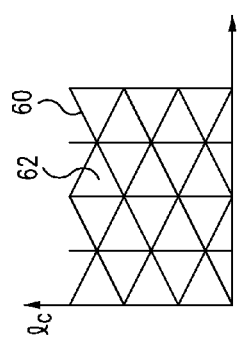
FIG. 6E
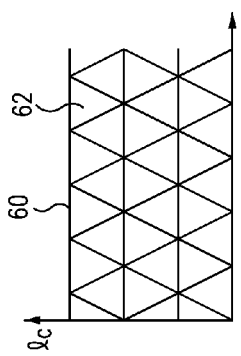
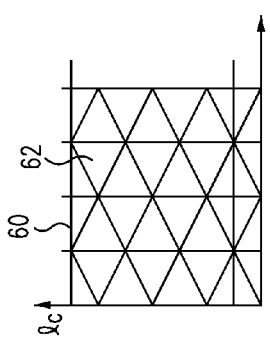
FIG. 6F
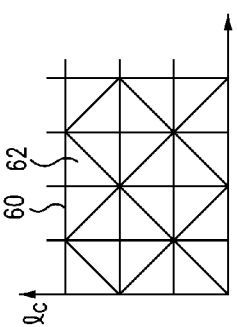
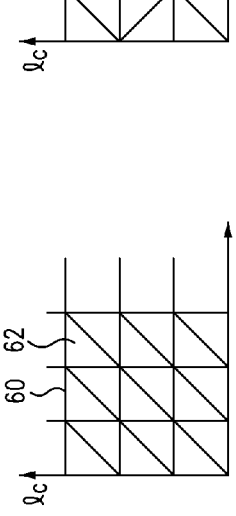
FIG. 6G

WEIGHT-OPTIMIZING INTERNALLY PRESSURIZED COMPOSITE-BODY AIRCRAFT FUSELAGES HAVING NEAR-ELLIPTICAL CROSS SECTIONS

RELATED APPLICATIONS

This application is a continuation in part of U.S. application Ser. No. 11/273,966, filed Nov. 15, 2005, now U.S. Pat. No. 7,621,482, issued Nov. 24, 2009, hereby incorporated by reference.

TECHNICAL FIELD

This disclosure relates to aircraft design in general, and in particular, to the design of lightweight shell structures for pressurized aircraft fuselages having an elliptical or near-elliptical cross-section.

BACKGROUND

Certain classes of internally pressurized aircraft fuselages, such as are found in passenger planes, can beneficially employ near-elliptical cross-sections. For example, U.S. Pat. No. 6,834,833 to M. K. V. Sankrithi discloses the use of an aircraft having a fuselage 10 with a quasi-elliptical, or near-elliptical cross-section that is wider than it is tall. Representative front-end and a top plan cross-sectional views of this class of fuselage shape are illustrated in FIGS. 1A and 1B, respectively, wherein the fuselage comprises a rigid, light weight shell 12 having respective opposite, closed nose and tail ends 14 and 16. This cross-section efficiently encloses a main deck cabin 18, typically provisioned as a spacious and comfortable twin-aisle, seven-abreast cabin, together with a cargo container 14 (typically a LD-3-46W or similar, standardized type of container) in a pressurized lower deck hold 20. This twin-aisle fuselage cross-sectional shape has also been shown to provide a perimeter-per-seat ratio comparable to that of a corresponding single-aisle, six-abreast, conventional aircraft fuselage having a circular or "blended circular arc" cross-section, and consequently, can also provide a cross-section-parasite-drag-per-seat ratio and an empty-weight-per-seat ratio that, in a first-order analysis, are comparable to those of the corresponding single-aisle fuselage cross-section, while offering better passenger comfort and owner revenue options.

However, achieving an optimized, lightweight structure for such near-elliptical cross-section fuselages when they are constructed of composite materials, i.e., reinforcing fibers embedded in resin matrices, presents substantial engineering design challenges, not only because of the application of such materials to this relatively new application, but also because of the structural and weight penalties involved in moving from a fuselage design having a conventional circular cross-section to a fuselage design having a non-circular cross-section, especially those associated with the internal pressurization effects inherent in the design of high-altitude jet airliners.

Accordingly, there is a need in the aviation industry for design methods and techniques for achieving lightweight structures for pressurized, composite-body aircraft fuselages having an elliptical or a near-elliptical cross-section.

BRIEF SUMMARY

In accordance with the various example embodiments described herein, the present disclosure provides methods for weight-optimizing, i.e., minimizing the weight of, an internally pressurized, composite fuselage structure for an aircraft having a near-elliptical shape by "tailoring," i.e., selectively varying, selected structural attributes of substantially every element of the fuselage as a function of at least the angular coordinate $\phi$ of a cylindrical coordinate system of the fuselage, so as to effectively "react," i.e., to sustain without failure, all design loads incident thereon, and optionally, with any level of redundancy or safety factor desired.

In one embodiment, a method for minimizing the weight of an internally pressurized aircraft fuselage of a type that includes an elongated tubular shell having a central axis x, opposite nose and tail ends, a near-elliptical cross-section having a radius $R(\phi)$- and a curvature $Curv(\phi)$ at substantially every point along the x axis between the two ends, where $\phi$ is a roll elevation angle of the shell, comprises tailoring at least one structural attribute of the shell as a function of at least one of the elevation angle $\phi$, $R(\phi)$ and $Curv(\phi)$ so as to reduce the weight of the fuselage relative to an identical fuselage shell in which the same at least one structural attribute has not been so tailored, wherein the tailoring function is periodic for $\phi=0$ to 360 degrees, with a period of 360/n degrees, n is an integer, and the tailoring function includes at least two local extrema located within 15 degrees of the $\phi$ values corresponding to a maximum $R(\phi)$ located near the major axis of a true elliptical cross-section.

In another embodiment, an aircraft comprises a fuselage, including an elongated internally pressurized tubular shell having a centerline axis, opposite closed nose and tail ends, and a near-elliptical cross-section having a radius $R(\phi)$, where $\phi$ is an elevation angle defined by an angular coordinate of a cylindrical coordinate system concentric with the centerline axis, a curvature $Curv(\phi)$, where $Curv(\phi)$ is the inverse of a local radius of curvature of a surface of the shell, and a circumference that varies radially by no more than $\pm 7\%$ from the circumference of a true elliptical cross-section at substantially every position along the centerline axis between the nose and tail ends thereof, wherein the shell of the fuselage includes at least one structural attribute that has been tailored as a function of at least one of the elevation angle $\phi$, $R(\phi)$ and $Curv(\phi)$ so as to reduce the weight of the fuselage relative to an identical fuselage shell in which the same at least one structural attribute has not been so tailored, and wherein the tailoring function is periodic with $\phi$ for $\phi=0$ to 360 degrees, with a period of 360/n degrees, n is an integer, and the tailoring function includes at least two local extrema located within 15 degrees from the $\phi$ values corresponding to a maximum $R(\phi)$ located near the major axis of the true elliptical cross-section.

BRIEF DESCRIPTION OF THE DRAWINGS

FIGS. 5A-5D are plan views of example embodiments of selected alternative structural components of the composite-body fuselage shell of FIG. 2, showing example core cells of a composite-sandwich fuselage architecture;

FIGS. 6A-6G are plan views of alternative embodiments of selected structural components of the fuselage shell of FIG. 2, showing example embodiments of grids of a composite "Isogrid" fuselage architecture;

DETAILED DESCRIPTION

Figure 1A:
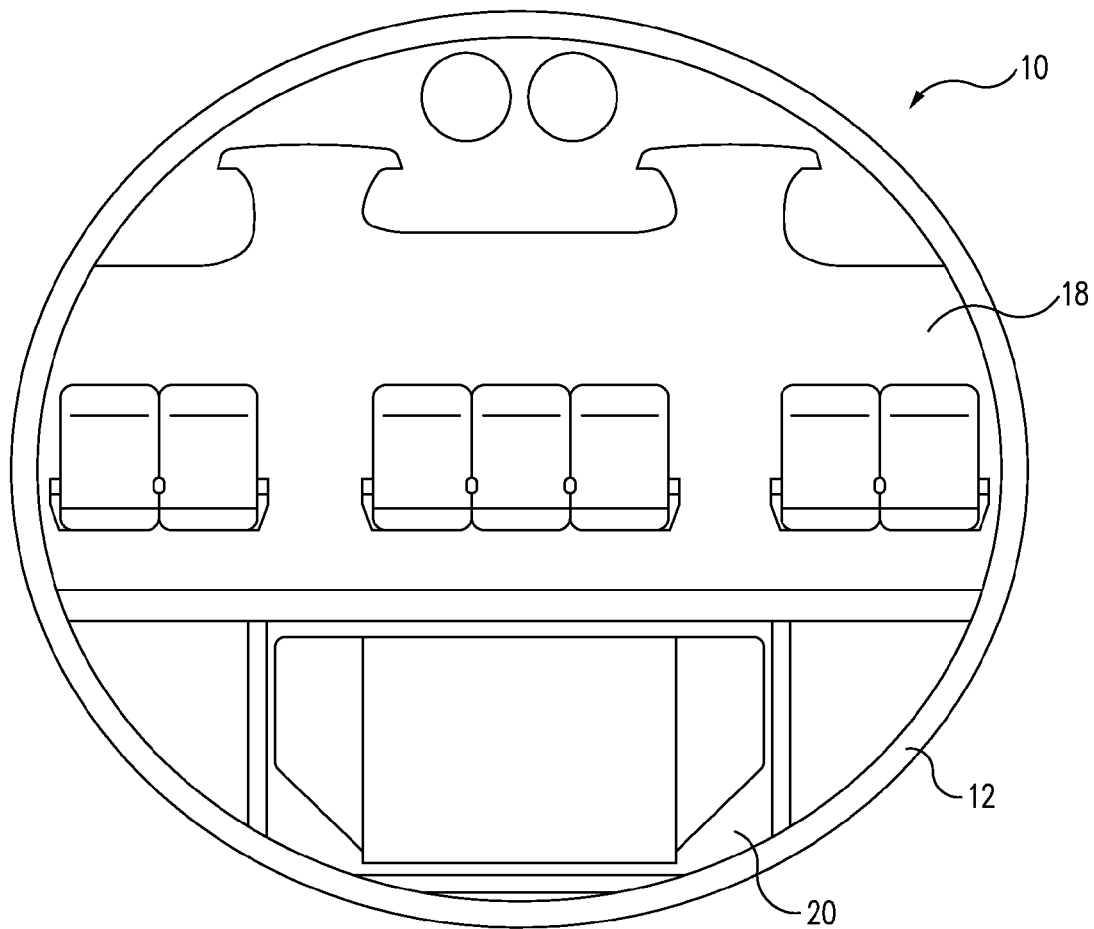
FIGS. 1A and 1B are cross-sectional front end and top plan views, respectively, of an internally pressurized aircraft fuselage having an elliptical or near-elliptical cross section in accordance with the prior art.
Figure 1B:
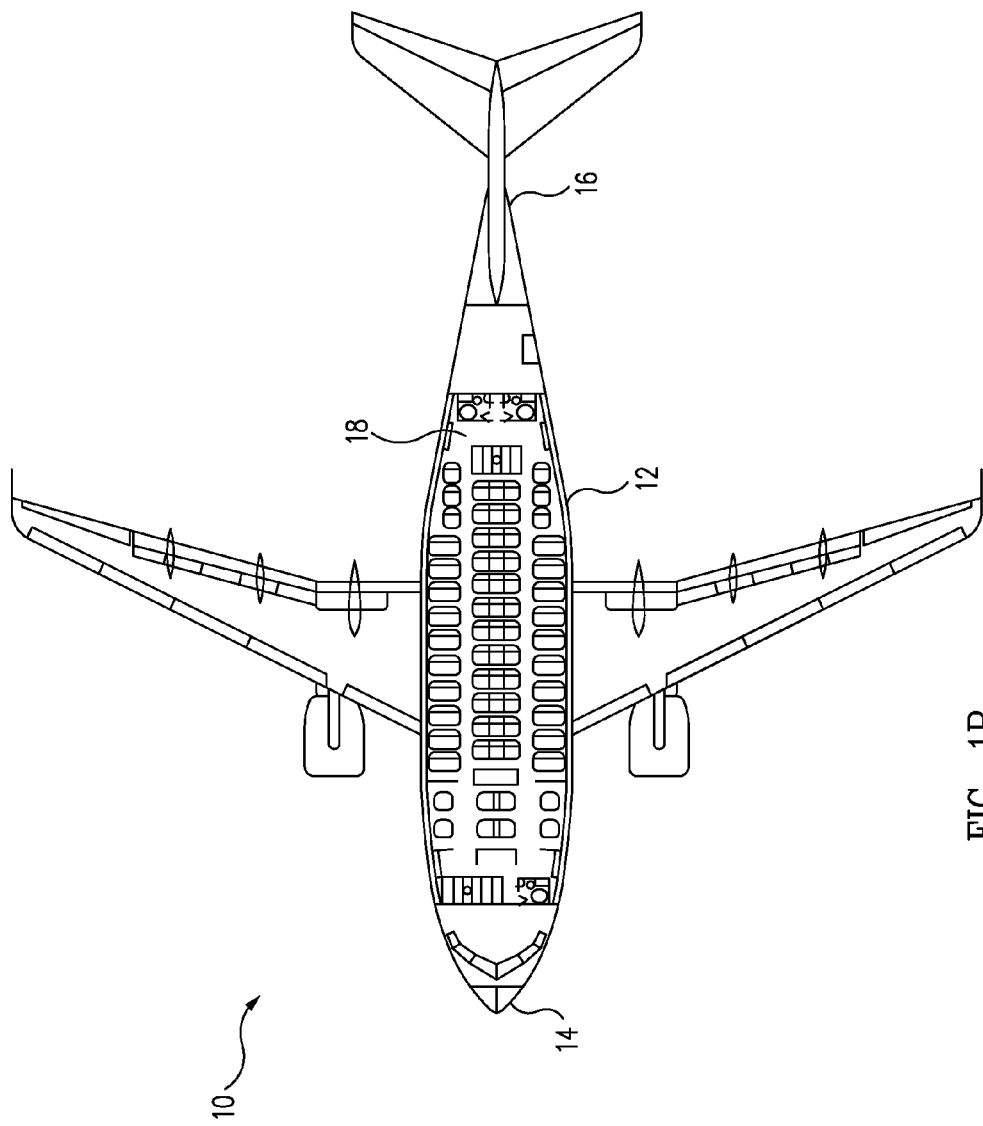

FIGS. 1A and 1B respectively illustrate cross-sectional front end and top plan views of a prior art pressurized aluminum aircraft fuselage 10 having a passenger cabin 18 and a cargo compartment 20. This disclosure provides a method for minimizing the weight of the fuselage shell structure for such an aircraft in which the shell is made of a composite material and has a near-elliptical cross-section by applying "tailoring," i.e., optimally selected adjustments of selected structural attributes to more closely match critical design loads as a function of the roll elevation angle $\phi$ measured around the centerline axis of the cross-section.

Figure 2A:
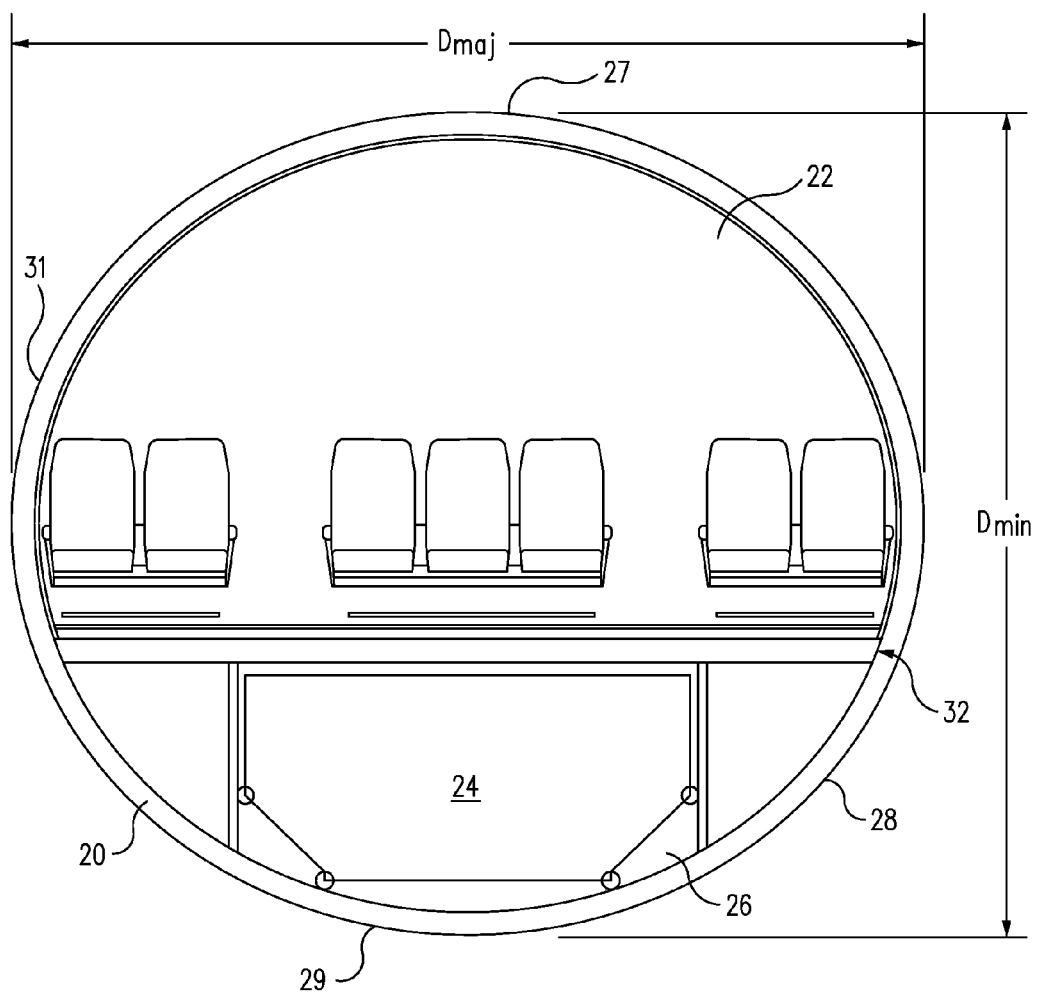
FIGS. 2A and 2B are cross-sectional front end and top plan views, respectively, of an example embodiment of an internally pressurized composite-body aircraft fuselage shell having an elliptical or near-elliptical cross section in accordance with the present disclosure.

An example embodiment of a composite body fuselage shell 20 having a near-elliptical cross-section in accordance with the present disclosure is illustrated in the front-end cross-sectional view of FIG. 2A. In FIG. 2A, the outer periphery of the shell is designated 28, and a window belt 31 is disposed adjacent to a passenger cabin 22. A cargo compartment 26 and main cabin floor 32 are shown with a "Unit Load Device," or cargo container 24. A crown region 27 and a keel region 29 of the shell define the upper and lower extremities of the shell 20.

For the purposes of this disclosure, the term "near-elliptical cross-section" should be understood as a cross-section that is approximately elliptical in shape, with a width-to-height (or height-to-width) ratio that is between 1.01 and 1.30, and with a cross-sectional periphery, or circumference, that is either a "pure" ellipse, i.e., strictly elliptical in shape, or that is between about ±7% from such a strictly elliptical shape, as measured in a direction extending radially outward from the centerline axis of the fuselage shell cross-section, at substantially every point, or longitudinal station, along the central axis thereof.

Figure 2B:
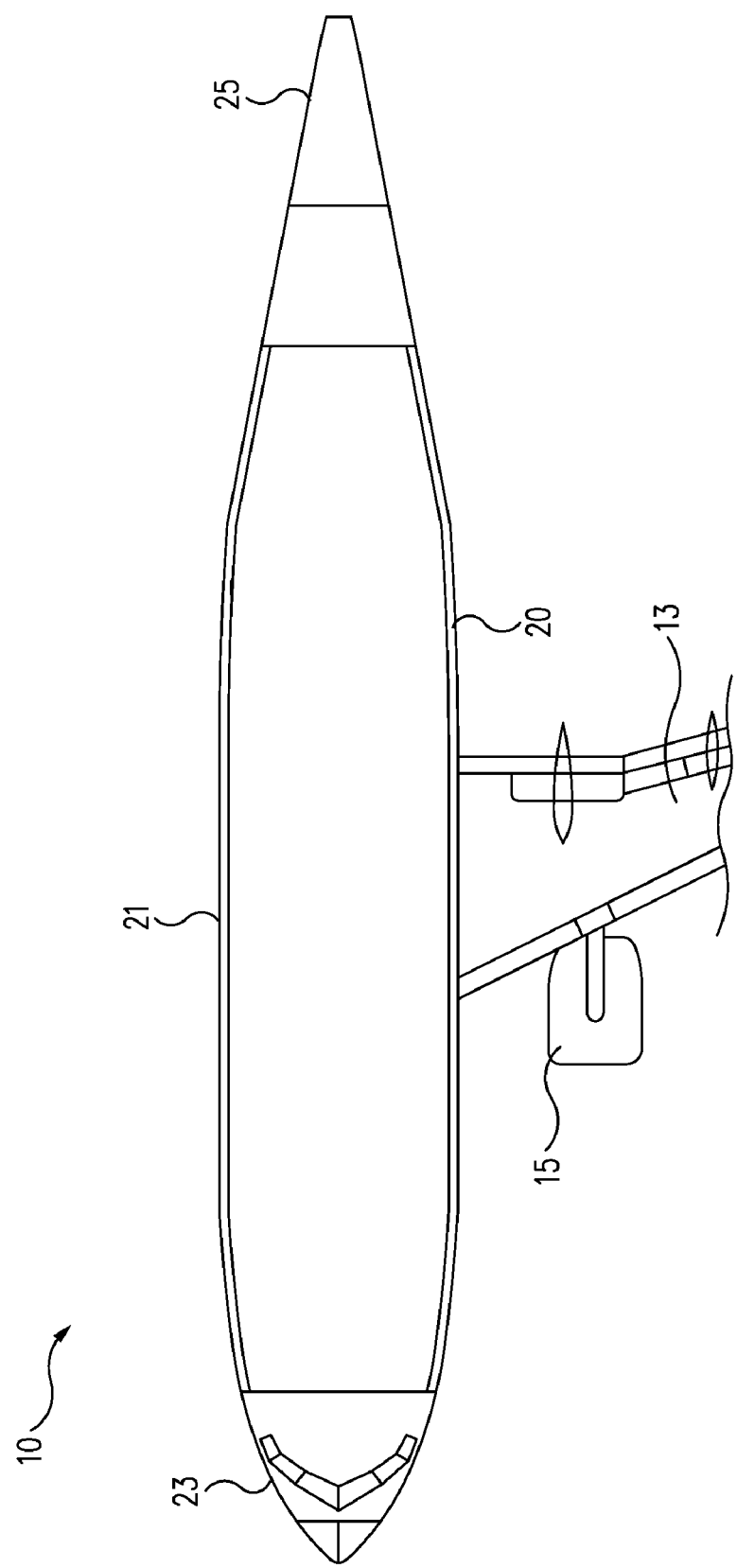

FIG. 2B illustrates a plan view of the embodiment of FIG. 2A, showing an elongated, internally pressurizable tubular composite shell 21 and opposite closed nose and tail ends 23 and 25, as well as means for lifting (e.g., wings 13) the shell off the ground and propelling it (e.g., engines 15) forward relative to the ground.

Figure 3:
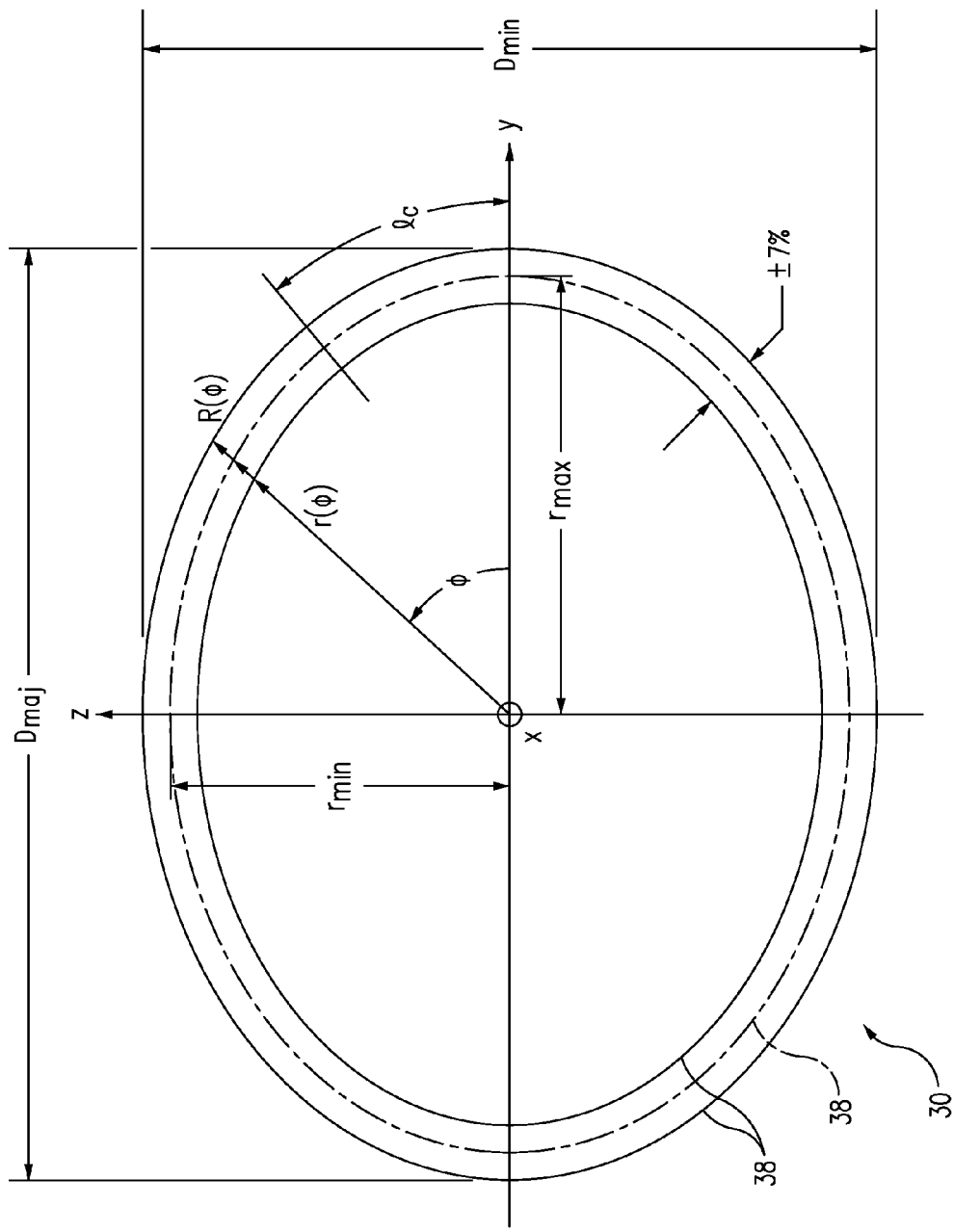
FIG. 3 is a cross-sectional diagram of the example composite body fuselage shell of FIG. 2, as expressed in a cylindrical coordinate measurement system.

As illustrated schematically in FIG. 3, for purposes of description, a cylindrical coordinate system is adopted, with x positive forward substantially along the longitudinal, or centerline axis of the fuselage shell 30; where the radius r is positive radially outward from the x axis, and the angular coordinate φ is positive rotating upward from φ=0 from a substantially horizontal vector pointing to the left of the aircraft, looking forward, at right angles to the x axis. Thus, it may be seen that the cylindrical angular coordinate φ corresponds to a "roll elevation angle" of the shell that varies from 0 degrees to +360 degrees about the x axis. The corresponding Cartesian coordinate system has an x-axis that is positive forward along the centerline axis of the fuselage shell cross-section, a y axis that is positive to the left side of the centerline axis of the aircraft, looking forward, and a z axis that is positive upwards from the centerline axis, as illustrated in FIG. 3.

If the nominal shape of the periphery or circumferential perimeter 38 of the cross-section of the aircraft's fuselage shell 30 is that of a "true" ellipse, as shown by the phantom line of FIG. 3, i.e., one having a substantially horizontal major axis of diameter $D_{maj}$ (width) equal to $2 \cdot r_{max}$ and a substantially vertical minor axis with a diameter $D_{min}$ (height) equal to $2 \cdot r_{min}$, and with an eccentricity e given by $$e = \sqrt{(1-(r_{min}/r_{max})^2)},$$

then the radius r, expressed as a function of φ, is given by $$r(\varphi) = \frac{D_{min}}{2 \cdot \sqrt{[((r_{max}/r_{min})^2 \cdot (\cos\varphi)^2) + (\sin\varphi)^2]}},$$

or, by defining $A=(r_{min}/r_{maj})=(D_{min}/D_{maj})$, by $$r(\varphi) = \frac{D_{min}}{2 \cdot \sqrt{((A^2 \cdot \cos^2\varphi) + \sin^2\varphi)}}.$$

A "curvature," κ(φ), defined as the inverse of the local radius of curvature for the surface, is given for the true elliptical shape 38 by the following equation:

$$\kappa(\varphi) = \frac{\left[r^2 + 2 \cdot \left(\frac{\partial r}{\partial \varphi}\right)^2 - r \cdot \frac{\partial^2 r}{\partial \varphi^2}\right]}{\left[r^2 + \left(\frac{\partial r}{\partial \varphi}\right)^2\right]^{1.5}}.$$

However, if the nominal cross-sectional outer surface or perimeter 38 of the shell 30 is not a true ellipse, but rather, a near-ellipse, as described above, the equations for the local radius and curvature are not exactly as stated above, but instead, result in slightly different equations, or more practically, can comprise digitally specified curves that are amenable to manipulation using digital computer modeling techniques. Thus, for purposes of this disclosure, a fuselage shell 30 is considered to have a "near-elliptical" cross-sectional shape when its radius function R(φ) varies by no more than ±7% from a radius r(φ) of a true elliptical cross-section r(φ), as illustrated in FIG. 3. Likewise, the local curvature of the near-ellipse, defined herein as "Curv(φ)," may differ correspondingly from the curvature κ(φ) of the pure elliptical shape, and still be deemed to have a near-elliptical cross-sectional shape in accordance with this disclosure.

As those of skill in the art will appreciate, the distribution of critical design loads around the circumferential perimeter 38 of a near-elliptical fuselage shell 30, particularly those resulting from internal pressurization of the shell, will vary at different longitudinal fuselage locations, or stations, depending not only on the pressurization-induced loads, but also on combinations of such pressurization loads with other fuselage bending and torsional loads, for example, those resulting from horizontal and vertical tail-maneuver related loads, or from wind gust loads, and further, critical design loads may be driven by compression, tension, shear and buckling considerations in selected parts of the fuselage structure, as well as minimum material gauge or thickness considerations, barely visible impact damage (BVID) criteria for potential damage by hail or other impacts, and by fatigue and/or aeroelastic design considerations and criteria.

It may be further appreciated that achieving an optimized, lightweight structure, or shell, for such near-elliptical cross-section fuselage shells presents a design challenge because of the structural and weight penalties involved in implementing a design having a non-circular cross-section, especially those associated with internal pressurization effects. However, it is has been discovered that it is possible to achieve a weight-optimized near-elliptical fuselage shell in accordance with the example methods described below.

Initially, it should be understood that the example near-elliptical shell 30 of FIG. 3 has at least one, and typically, many structural attributes, such as skin thickness, composite tape ply direction, frame depth, and the like, associated with the non-constant-radius portions of every cross-section thereof that can be "tailored," i.e., selectively modified, as a function of the elevation angle φ such that the weight of the shell required to withstand, or effectively react, the specified design loads acting thereon, including any safety factor desired, will be less than the weight of an identical shell designed to react the same design load, but in which same structural attributes have not been so tailored, i.e., one in which the structural attributes are uniform or constant throughout the cross-section and have been designed to react the largest design load acting thereon.

In one example embodiment of a weight optimizing method, the function of φ comprises a function of either R(φ), Curv(φ) or a combination thereof. Thus, as discussed in more detail below, an example embodiment of a method for minimizing the weight of the example fuselage shell 30 comprises defining at least one structural attribute of the non-constant-radius portions of every cross-section of the shell as a function of either $R(\phi)$, $Curv(\phi)$, or a combination thereof, i.e., as a "functional," and then tailoring the at least one structural attribute of those portions such that the weight of the shell required to effectively react all design loads incident on those portions is less than that required to react the same design loads incident thereon, but wherein the at least one structural attribute has not been so tailored.

Figure 4:
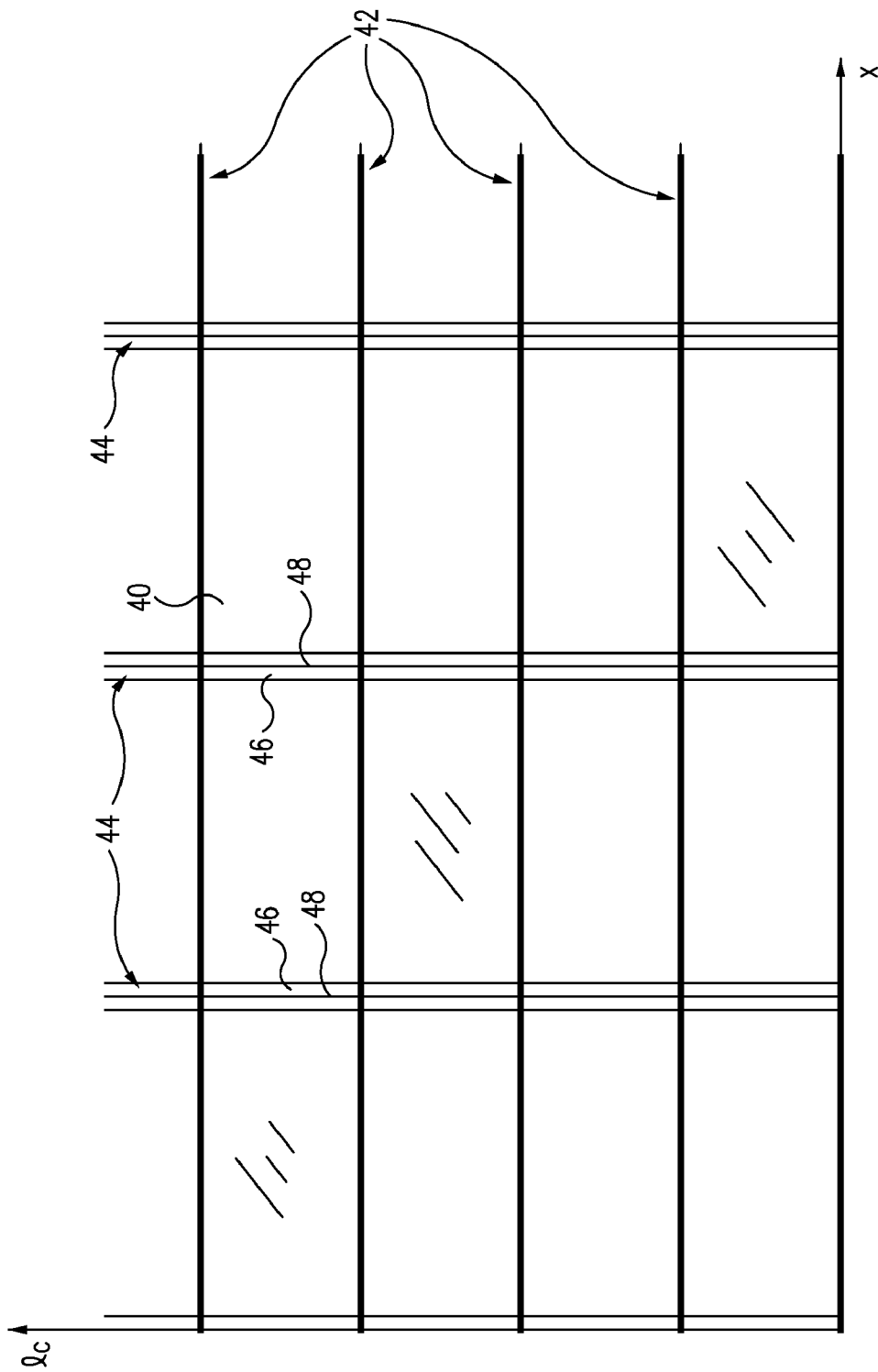
FIG. 4 is a schematic illustration of an example embodiment of selected structural components of the fuselage shell of FIG. 2, as expressed in a cylindrical coordinate measurement system and mapped onto a two-dimensional plane, showing a stringer/frame type of fuselage architecture.

FIG. 4 schematically illustrates a representative "skin/stringer" geometry used in typical composite-body aircraft fuselage shell architecture, shown as if cut open longitudinally and laid out flat, or "mapped," onto a two-dimensional plane having an abscissa parallel to the centerline axis x of the shell, and an ordinate corresponding to a circumferential distance $1_c$ from the abscissa (see FIG. 3), in which the structural components of the shell comprise at least one outer circumferential skin 40, or "aeroskin," attached to a generally orthogonal grid structure that includes a plurality of circumferentially spaced longitudinal longerons, or "stringers" 42, disposed generally parallel to each other and the longitudinal x-axis of the shell, and a plurality of longitudinally spaced formers, or "frames" 44, disposed generally parallel to each other and orthogonal to the stringers. The skin 40 may comprise a laminate of one or more sheets of reinforcing fibers, e.g., carbon or boron, embedded in a resin matrix, or alternatively, a plurality of composite tapes that are "laid up" on a forming mandrel and then cured by, e.g., autoclaving or radiation with microwaves or electrons (E-beams). The stingers 42 and frames 44 may be similarly constructed, and the frames may further include composite circumferential flanges 46 and radial webs 48.

In accordance with the present disclosure, the weight-optimization, or tailoring, of the structure for a skin-stringer fuselage architecture such as that illustrated in FIG. 4 can include one or more of tailoring the associated structural attributes, as a function of $\phi$, of the gauge or thickness of the skin 40; the radial depth of the frames 42; the thickness of the respective frame flanges 46; the thickness and width of the respective frame flanges 46 and webs 48; and additionally, the tailoring of those structural attributes as a function of $\phi$ and stringer 42 cross-sectional shape and/or size (e.g., "hat-shaped", "F", "T", "L" shaped, etc.), as well as the type of materials, e.g., a metal, such as aluminum, or a non-metal, e.g., carbon fibers embedded in specified orientations, patterns and layers, in a resin matrix, from which each of these structural components are formed.

For composite skins 40, the structural attributes that can be tailored as a function of $\phi$ include the number of plies, or layers, in the skin, and/or their ply direction, i.e., the respective angular orientation of the plies relative to each other and the shell 30, and the percentage distribution, by orientation angle, of the plies provided at that particular $\phi$ location in the cross section. The skins 40 can also be tailored in terms of variations in the types and quantities of materials (i.e., composite, metallic, or a combination thereof) used therein as a function of $\phi$.

As is known, composite-body aircraft fuselages can also advantageously incorporate shells comprising composite "sandwiches," i.e., stiff, lightweight "core" structures 50 comprising either a continuous foam or a honeycomb of cells 52 laminated between two circumferential skins, or face sheets. Representative core cell geometries are illustrated in FIGS. 5A-5D, where it should be understood that the cores are sandwiched between inner and outer skins or face sheets (not illustrated).

Such tailoring of fuselage shell structural attributes as a function of $\phi$ and one or more other variables can also be advantageously applied to other structural components of sandwich composite structures, including the skins thereof, i.e., tailoring as a function of $\phi$ and inner and outer skin or face sheet properties, including the number of plies therein, respective ply relative and/or absolute orientation angles, and/or percentage distribution by orientation angle of the plies provided at that particular value of $\phi$, as well tailoring as a function of $\phi$ of sandwich core thickness, and/or cell density, core material and/or sandwich-specific localized design and construction. Thus, for example, the core material can be tailored throughout the design process by varying, for example, core material, type and density.

The tailoring of fuselage structural attributes as a function of $\phi$ can also be effected in the context of so-called "isogrid" structures. An isogrid panel comprises at least an external aeroskin, or face sheet, as above, with integral stiffening or stringer members 60 that are arranged in patterns of cells 62, as illustrated in FIGS. 6A-6G, and is amenable to structural analysis using known isogrid plate-modeling techniques. (See, e.g., Meyer, R., et al., *Isogrid Design Handbook*, NASA Center for Aerospace Information (CASI), NASA-CR-120475; MDC-G4295A, Feb. 1, 1973.) In the case of an aircraft fuselage shell, such isogrid structures can comprise a face sheet and integral stringer members that, in the case of composite-body structures as described above, can be laid up together by, for example, known fiber placement or filament winding techniques. Tailoring of the structural attributes of isogrid structures as a function of $\phi$ can be effected for isogrid structures in a manner similar to isogrid design and construction attributes that vary as a function of $\phi$. This can include grid type, shape, spacing and material utilization, including mixing material types for both the grid face sheets and the isogrid integral stringer members.

Figure 7:
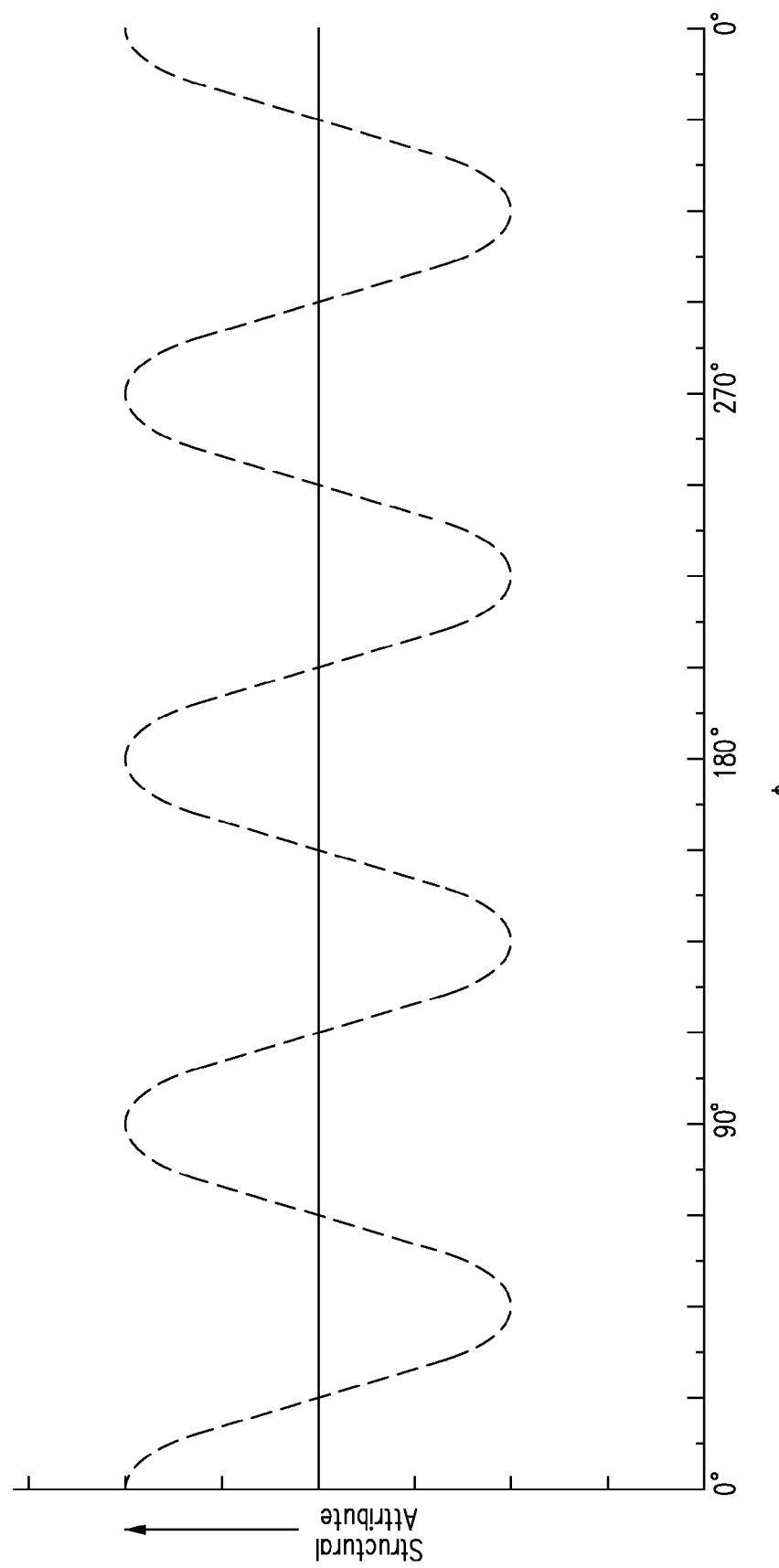
FIG. 7 is a graph illustrating an example embodiment of the periodic circumferential tailoring of a selected structural attribute of an example near-elliptical composite fuselage shell.

FIG. 7 illustrates an example of the circumferential tailoring of a structural attribute of a fuselage shell plotted as a function of $\phi$. The dashed curve of the figure is representative of those cases wherein the structural attribute is linearly or monotonically varying with increasing $[|R(\phi)-\overline{R}|]$ or $[|Curv(\phi)-\overline{Curv}|]$. The subject structural attribute could be skin gage, frame depth, or another structural attribute of the type discussed above. If the subject structural attribute is, for example, frame depth, then as illustrated in FIG. 7, the local frame depth in a crown region (i.e., $\phi$ near 90°, where $Curv(\phi)$ is at a local minimum for the representative cross-section of FIG. 3) is increased relative to the average frame depth, and the local frame depth in a keel region (i.e., $\phi$ near 270°, where $Curv(\phi)$ is at a local minimum for the representative cross-section of FIG. 3) is also increased relative to average frame depth. It should be understood that the tailoring function shown in FIG. 7 is only by way of example, and that airplane-specific tailoring functions can differ in shape, character and magnitude as needed to minimize weight and drag for the design loads of the specific application.

Figure 8:
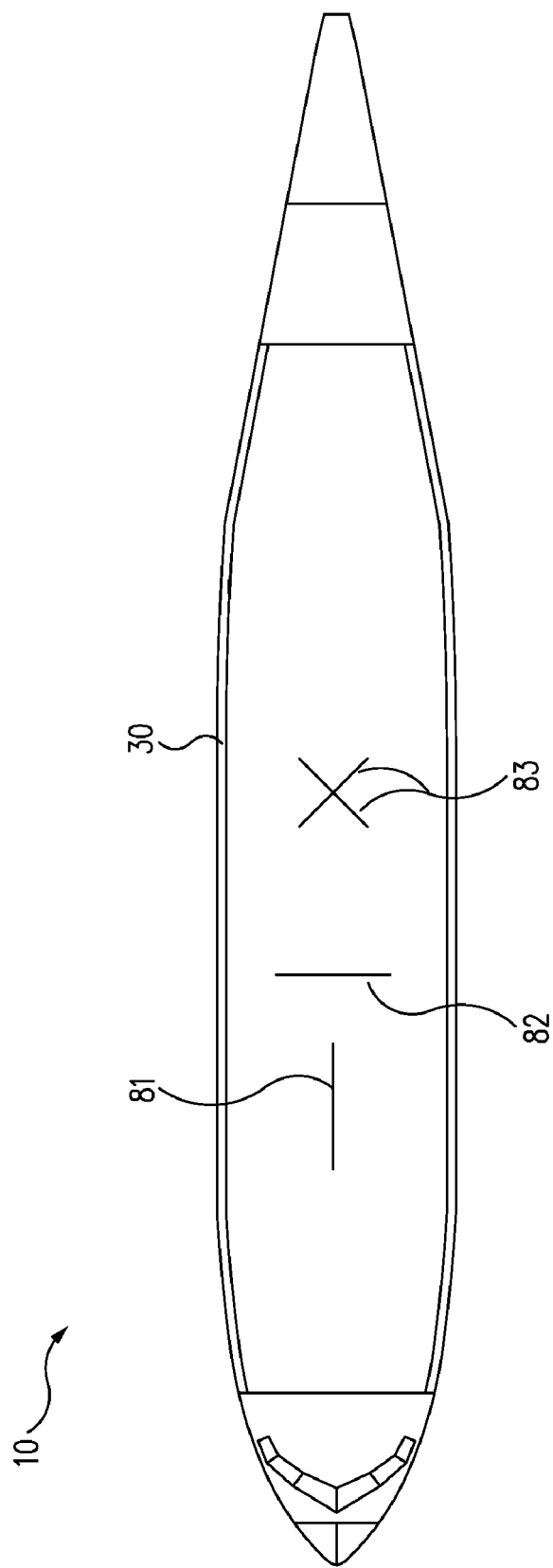
FIG. 8 is a schematic top plan view of a composite-body fuselage shell structure showing conventional composite tape ply directions or orientations.

FIG. 8 is a schematic top plan view of a composite-body fuselage shell 30 structure. A local fuselage surface axis system is assumed to exist on the fuselage surface, and on the top surface would have (i) a "u" axis direction pointing away from the nose of the aircraft (i.e., in an opposite direction relative to the positive "x" axis of FIG. 3) and (ii) a "v" axis in a circumferential direction pointing towards the aircraft left side (i.e., opposite direction relative to "r*$\phi$" direction of FIG. 3). The local fuselage surface axis system of course has different 3-dimensional "v" axis directions (always in the opposite direction relative to local "r*$\phi$" direction of FIG. 3) at different fuselage circumferential locations. In the local fuselage surface axis system, a "zero degree" composite ply is substantially aligned with the u direction, and a "90 degree" composite ply is substantially aligned with the v direction.

In the context of the foregoing assumed local fuselage surface axis system, FIG. 8 illustrates conventional composite fiber tape ply directions, or orientations, including "zero-degree" plies 81, i.e., plies extending parallel to the long axis of the fuselage shell 30, "ninety-degree" plies 82, i.e., plies extending in a circumferential direction, and "plus-and-minus-forty-five-degree" plies 83. As discussed in more detail below in connection with, e.g., FIGS. 14A and 14B, the tailoring of a structural attribute in accordance with the present disclosure may include "ply-steering," i.e., adjusting the angular orientation of the plies of composite tapes on the surface of the shell 30 to angles other than the conventional 0, 45, 90, 135 and 180 degree orientations, to effectively react design loads acting at specific x, $\phi$ locations in a fuselage shell 30 while simultaneously reducing the associated weight thereof.

Figure 9:
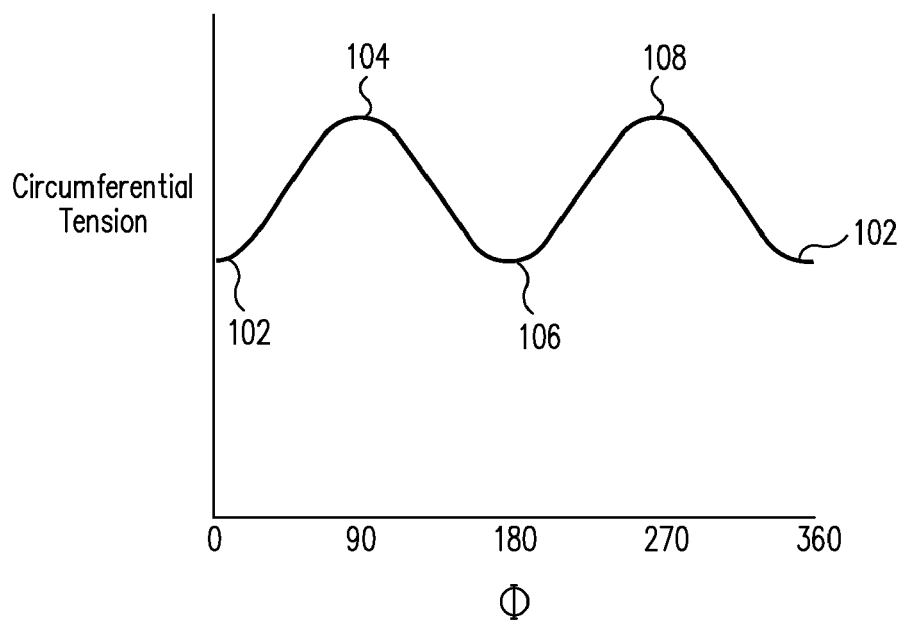
FIG. 9 is a graph illustrating the periodic nature of the pressure-induced circumferential tensions in an example composite-body fuselage shell having a near-elliptical cross section as a function of the cylindrical angular coordinate $\phi$.

FIG. 9 is a graph similar to that of FIG. 7 above, but illustrating the periodic nature of the pressure-induced circumferential tension acting in the shell 30 of a near-elliptical composite-body fuselage of the type illustrated in FIG. 3 at a selected longitudinal position x therein as a function of the cylindrical angular coordinate $\phi$. As may be seen in FIG. 9, the circumferential tension varies periodically with $\phi$, with minimum values occurring at the left and right sides 102 and 106 of the shell 30, and maximum values occurring at the crown 104 and keel 108 of the shell. It may be seen that, by tailoring one or more of the structural attributes of the shell 30 at each longitudinal position of the shell to effectively react the stresses acting at these particular values of $\phi$, the weight of the shell can be significantly reduced relative to that of a shell in which the same structural attributes have not been so tailored, but rather, remain constant and configured to react the maximum or peak circumferential stresses acting at that cross-section. As discussed below, the structural attributes that can be adjusted to effect the periodic tailoring may include skin and/or frame radial thickness, ply number and angular orientation, sandwich thickness, and a number of other structural attributes, depending on the particular structural architecture at hand.

Figure 10:
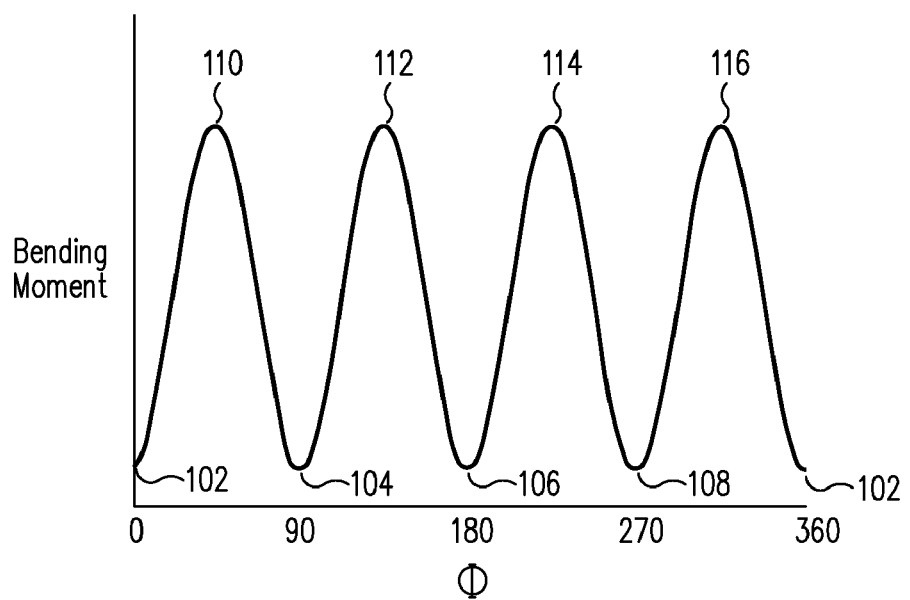
FIG. 10 is a graph illustrating the periodic nature of the pressure-induced circumferential bending moments in an example composite-body fuselage having a near-elliptical cross section as a function of the cylindrical angular coordinate $\phi$.

FIG. 10 is a graph similar to FIG. 9 above, but illustrating the periodic nature of the pressure-induced circumferential bending moment acting in the shell of a near-elliptical composite-body fuselage at a selected longitudinal position therein as a function of the cylindrical angular coordinate $\phi$. As may be seen in FIG. 10, the circumferential bending, like the circumferential tension, varies periodically with $\phi$, with minimum values occurring at the left side 102, the crown 104, the right side 106, and the keel 108 of the shell as above, but with maximum values occurring at values of $\phi$ corresponding to 45, 135, 225 and 325 degrees, respectively. As above, by tailoring one or more of the structural attributes of the shell at this longitudinal position in the shell to effectively react the particular bending stresses acting at these values of $\phi$ around the circumference of the shell at every cross-section along it length, the weight of the shell can be significantly reduced relative to that of a shell with no tailoring.

Figure 11A:
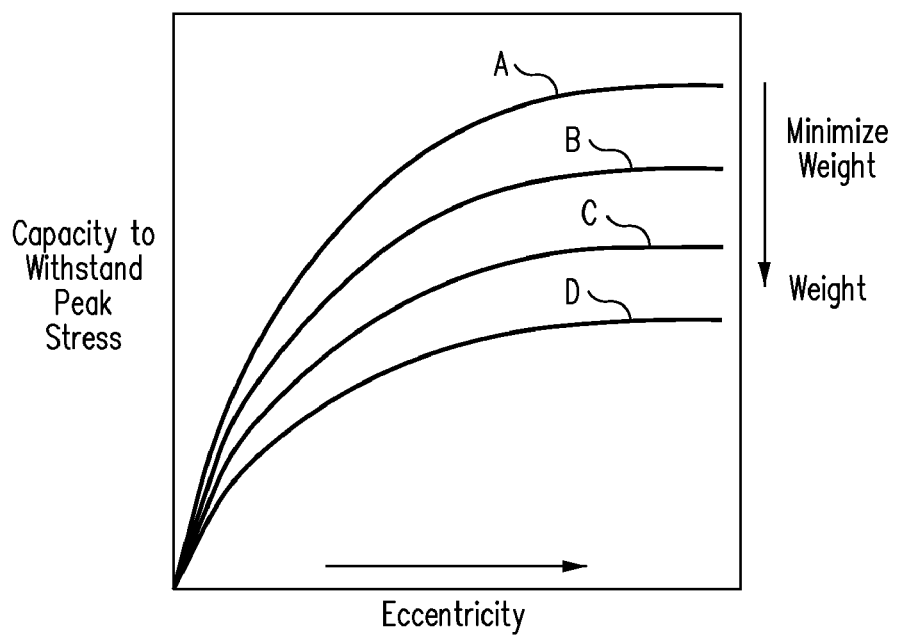
FIG. 11A is a graph with four curves respectively illustrating the ability of circumferential portions of the shell of an example composite-body fuselage having a near-elliptical cross section to effectively react peak stresses acting therein and the corresponding body weights associated therewith as a function of the eccentricity of the elliptical cross-section, with varying amounts of structural tailoring in accordance with the present disclosure.

FIG. 11A is a graph with four curves A-D respectively illustrating the ability of circumferential portions of a near-elliptical composite fuselage shell to effectively react peak stresses acting therein and the corresponding weights thereof, plotted as a function of the eccentricity of the shell, with varying amounts of structural tailoring having been applied to the structural attributes of the shell, wherein: Curve A is representative of a shell with no tailoring; curve B is representative of a shell in which the radial depth, or thickness, of the flanges of the shell have been tailored as above; curve C is representative of a shell in which tailoring of the direction or angular orientation of the composite tape plies of the shell (i.e., "ply steering") has been implemented; and, curve D is representative of a shell in which both frame depth and ply-orientation tailoring have been implemented.

As may be seen by reference to FIG. 11A and the curves A-D, the ability of a composite shell with a near-elliptical cross-section to react peak circumferential stresses generally increases with increasing eccentricity of the cross-section. Further, for any degree of cross-sectional eccentricity selected, while the ability of the shell to react peak circumferential stresses generally decreases with increasing amounts of tailoring, the weight of the shell also generally decreases in an amount corresponding to the amount of the structural attribute tailoring applied to the shell. Thus, the shell of curve A, with uniform or constant structural attributes around its circumference, can react greater peak stresses, but is in all events heavier than shells in which tailoring of structural attributes as a function of the cylindrical angular coordinate $\phi$ has been implemented. That is, the shell of curve A is "over-designed" relative to the respective shells of curves B-D, thereby incurring an unnecessary weight penalty in the shell.

Figure 11B:
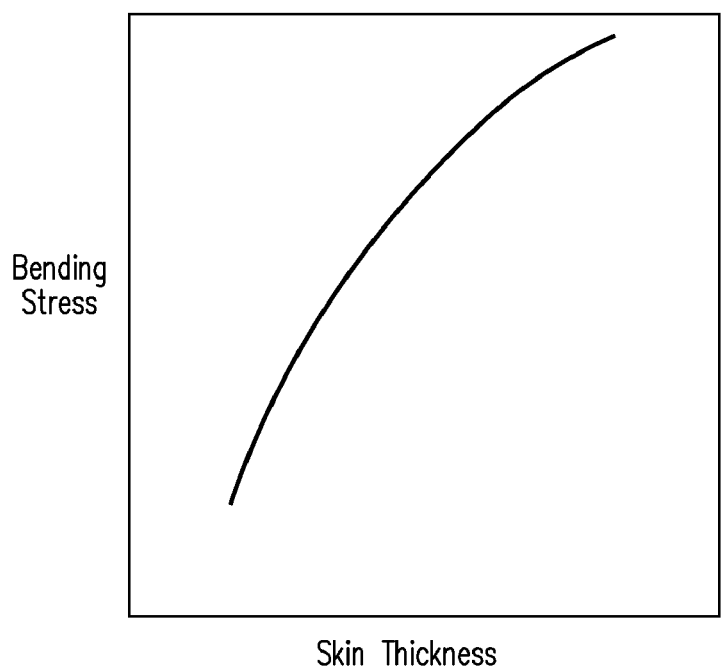
FIG. 11B is a graph illustrating the capacity of a composite skin to effectively react bending stress as a function of the thickness of the skin.

FIG. 11B is a graph illustrating the capacity of a composite skin to effectively react bending stress as a function of its thickness. Referring back to the graph of FIG. 10 above, showing the periodic nature of the circumferential bending moments in a near-elliptical composite fuselage shell due to internal pressurization, it may be seen that the thickness of the skin of a near-elliptical shell constitutes an important structural attribute that is readily amenable to the periodic tailoring of the present disclosure for purposes of weight optimization.

Figure 11C:
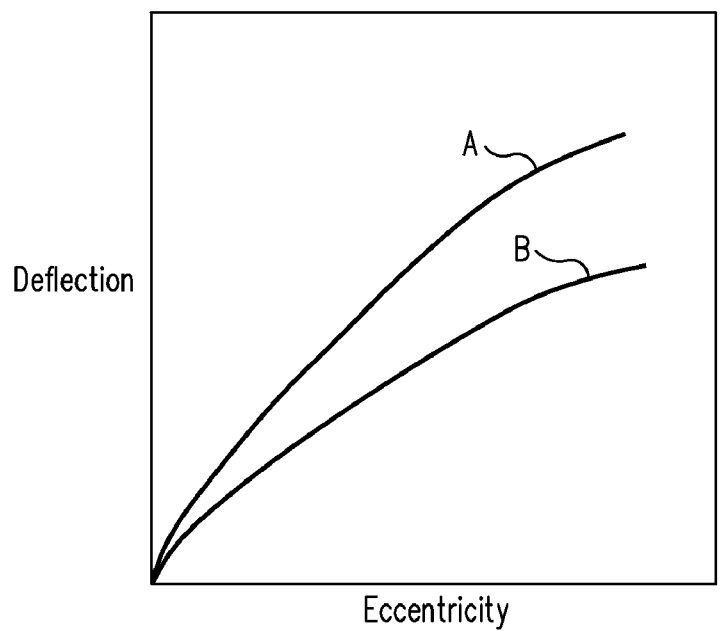
FIG. 11C is a graph with two curves respectively illustrating the pressure-induced deflection of an example composite-body fuselage shell having a near-elliptical cross section as a function of the eccentricity of the shell, with and without the structural tailoring of the present disclosure.

FIG. 11C is a graph with two curves A and B respectively plotting the internal pressurization-induced circumferential deflection of a composite-body fuselage having a near-elliptical cross section as a function of the eccentricity of the shell, with and without the structural tailoring of the present disclosure. In particular, curve A is representative of a shell with no tailoring, whereas, curve B is representative of a shell with some tailoring. As may be seen from FIG. 11C, for any selected degree of eccentricity of the shell cross-section, shells with no structural attribute tailoring experience substantially greater deflection than shells with tailoring.

Figure 11D:
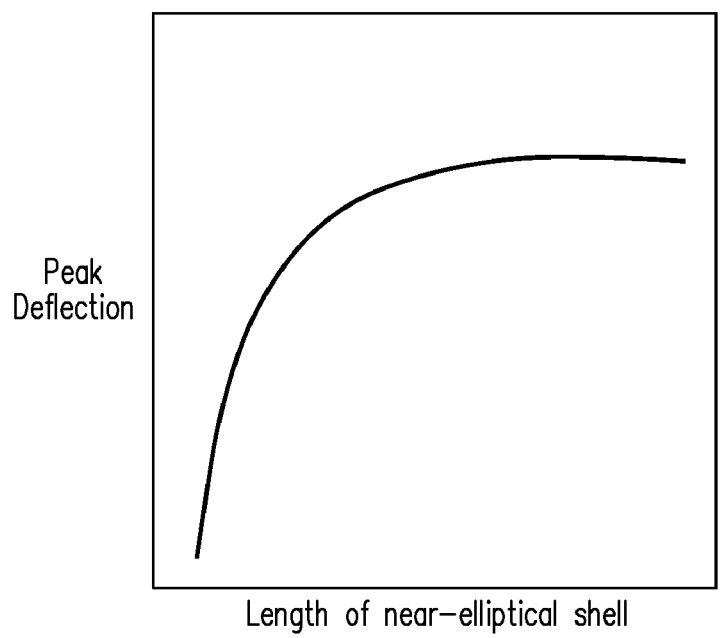
FIG. 11D is a graph illustrating the peak pressure-induced deflection in an example composite-body fuselage shell having a near-elliptical cross section as a function of its length.

FIG. 11D is a graph illustrating the peak pressure-induced deflection in an example composite-body fuselage shell having a near-elliptical cross section as a function of its length. As may be seen from FIG. 11D, and as described by K. Mizoguchi, et al. in "Deformation and Strength of a Pressure Vessel with Elliptical Cross Section," Japan Soc. of Mech. Engineers, vol. 11, No. 48, 1968, as a near-elliptical shell increases in length (i.e., fuselage length), peak pressure-induced deflections increase to a maximum at the longitudinal center of the fuselage.

Figure 12A:
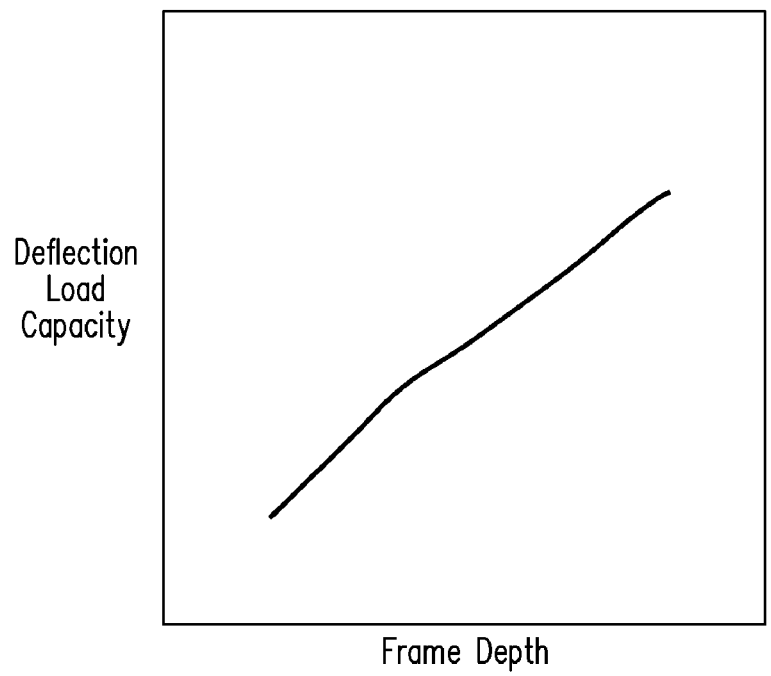
FIG. 12A is a graph illustrating the ability of an example composite-body fuselage shell having a near-elliptical cross section and circumferential structural frames to effectively react load deflections as a function of the radial depth of the frames.
Figure 12B:
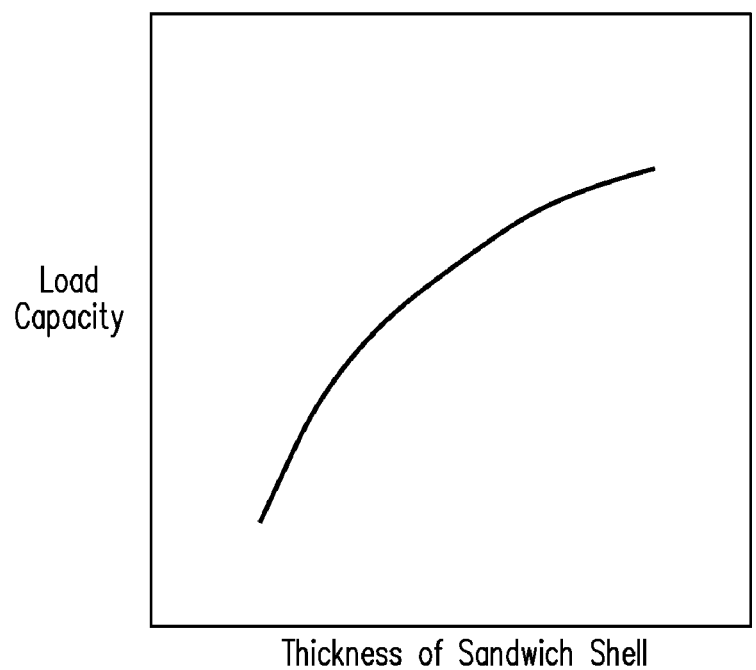
FIG. 12B is a graph illustrating the ability of an example composite-body fuselage shell having a near-elliptical cross section and comprising a sandwich-type construction to effectively react pressure-induced loads as a function of the thickness of the sandwich shell.

FIG. 12A is a graph illustrating the ability of an example composite-body fuselage having a near-elliptical cross section and circumferential structural frames 44 of the type described above in connection with FIG. 4 to effectively react load deflections as a function of the radial depth of the frames, and FIG. 12B is a graph illustrating the ability of an example composite-body fuselage having a near-elliptical cross section and a shell comprising a sandwich construction of the type described above in connection with FIGS. 5A-5D to effectively react internal pressure-induced loads as a function of the thickness of the sandwich shell.

As may be seen from FIG. 12A, as the frame depth or radial thickness increases, the ability of the elliptical frame to carry load increases, and from FIG. 12B, it may be seen that, as the thickness of the sandwich shell increases, the ability of the elliptical shell to effectively react deflection and stress loads increases. Thus, frame radial depth and sandwich shell thickness respectively constitute important structural attributes of these respective types of fuselage shells that are amenable to the periodic tailoring of the present disclosure for purposes of weight optimization.

FIG. 13A-13D are graphs respectively illustrating example embodiments of the periodic tailoring of the ply angle orientations of the composite tapes of an example composite-body fuselage shell having a near-elliptical cross section as a function of the cylindrical angular coordinate $\phi$. As described above in connection with FIG. 8, a ply angle of 0 degrees corresponds to a ply extending along the shell in a direction parallel to the long axis thereof, whereas, a ply angle of +90 or −90 corresponds to a ply extending circumferentially around the shell. Additionally, it should be understood that, in these example embodiments, one or more "steered" plies may be supplemented by one or more un-steered plies, i.e., plies that extend in the conventional 0, ±45 and ±90 degree directions illustrated in FIG. 8.

Figure 13A:
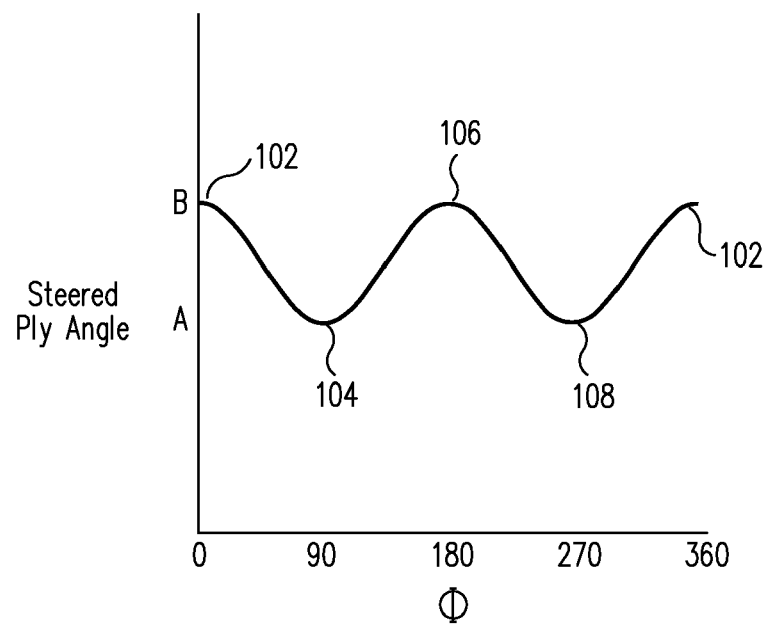
FIG. 13A is a graph illustrating an example embodiment of the periodic tailoring of the ply angle of a composite tape of an example composite-body fuselage shell having a near-elliptical cross section as a function of the cylindrical angular coordinate $\phi$ in accordance with the present disclosure.
Figure 13B:
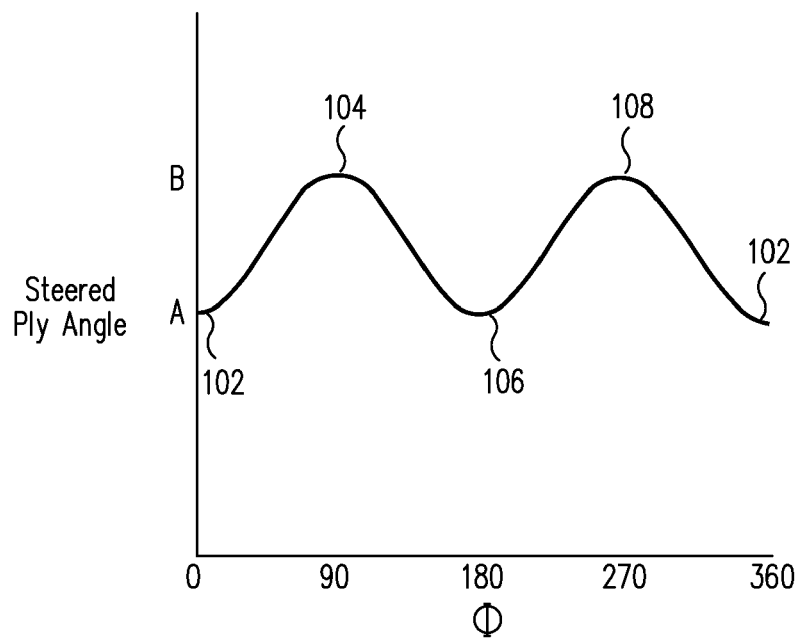
FIG. 13B is a graph similar to FIG. 13A, illustrating another example embodiment of the periodic tailoring of the ply angle of a composite tape of an example composite-body fuselage shell having a near-elliptical cross section as a function of the cylindrical angular coordinate $\phi$ in accordance with the present disclosure.

In the example embodiments of FIGS. 13A and 13B, the ply directions are seen to vary periodically, with a period of approximately 180 degrees, between the angular values A and B, and to change "phase" successively at the left side 102, crown 104, right side 106 and keel 108 of the fuselage shell, in a manner similar to the periodically varying circumferential tension illustrated in FIG. 10, with the difference between the two embodiments being that they are 180 degrees out of phase with each other. In the ply-steering embodiments of FIGS. 13A and 13B, the respective values of A and B may take on any angular values, depending on the desired tailoring effect. For example, in FIG. 13A, the angular direction of the ply may vary between A=5 degrees and B=45 degrees, whereas, in FIG. 13B, the angular direction of the ply may vary between about A=−85 degrees and B=−45 degrees.

Figure 13C:
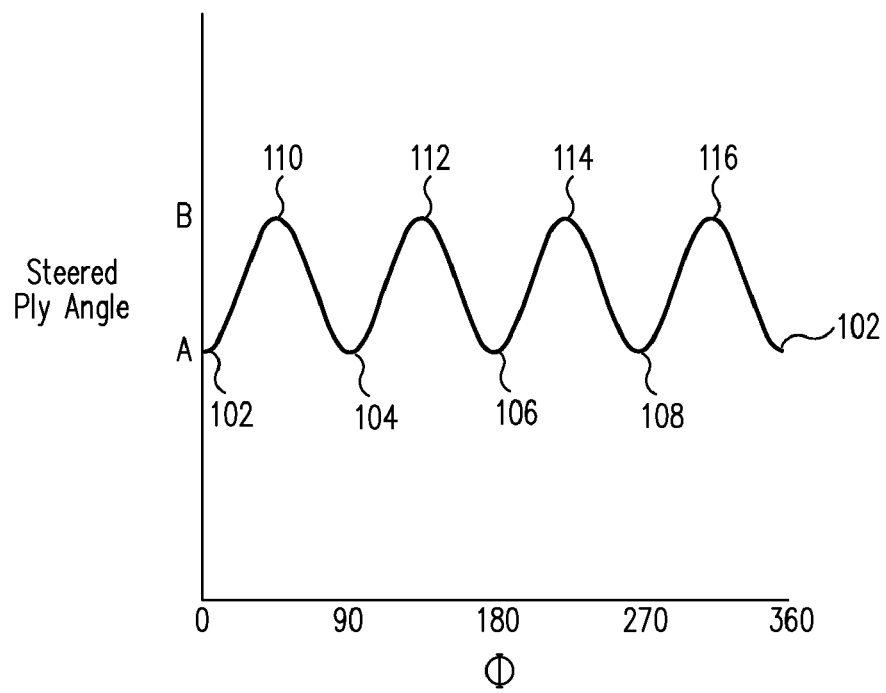
FIG. 13C is a graph similar to FIGS. 13A and 13B, illustrating another example embodiment of the periodic tailoring of the ply angle of a composite tape of an example composite-body fuselage shell having a near-elliptical cross section as a function of the cylindrical angular coordinate $\phi$ in accordance with the present disclosure.
Figure 13D:
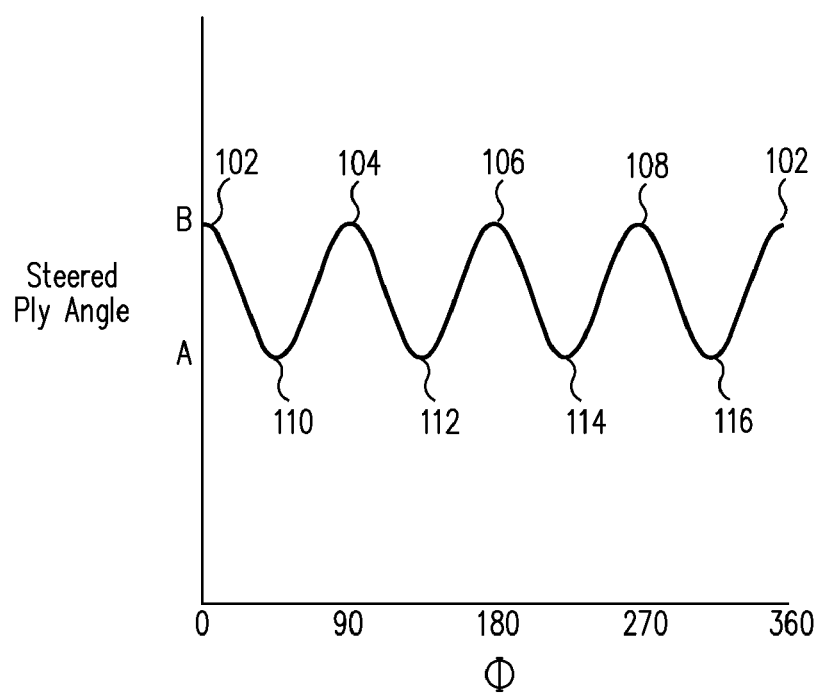
FIG. 13D is a graph similar to FIGS. 13A, 13B and 13C, illustrating another example embodiment of the periodic tailoring of the ply angle of a composite tape of an example composite-body fuselage shell having a near-elliptical cross section as a function of the cylindrical angular coordinate $\phi$ in accordance with the present disclosure.

In the example embodiments of FIGS. 13C and 13D, the ply directions also vary periodically, but with a period of approximately 90 degrees, between the angular values A and B, and change phase successively at the left side 102, crown 104, right side 106 and keel 108 of the fuselage shell, as well as at the intermediate values of $\phi$ corresponding to about 45, 135, 225 and 325 degrees, in a manner similar to the periodically varying circumferential bending moment described above in connection with FIG. 10, with the difference between the two embodiments being that they are 180 degrees out of phase with each other. As in the example embodiments of FIGS. 13A and 13B, the respective values of A and B may take on any angular values, depending on the desired tailoring effect to be obtained.

Figure 14A:
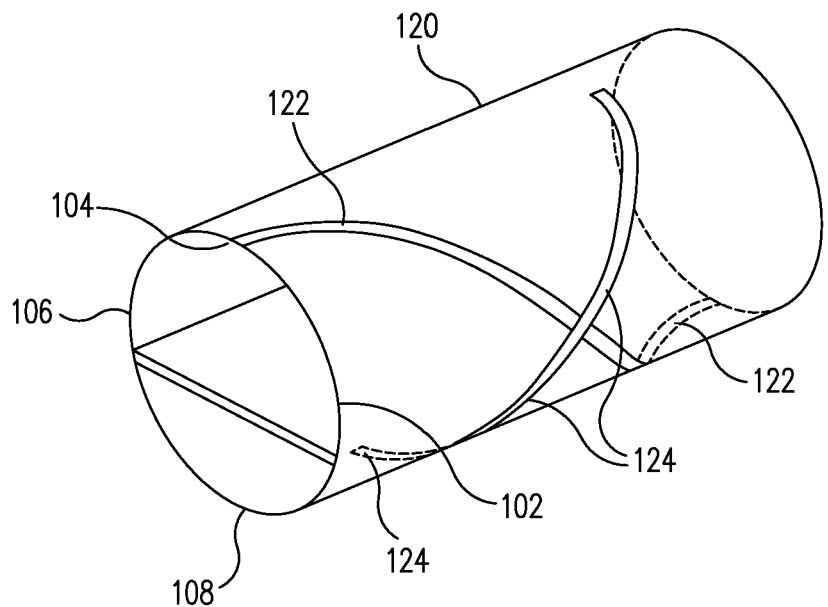
FIG. 14A is a partial perspective view of an example embodiment of a composite-body fuselage shell having a near-elliptical cross section, illustrating examples of the ply-angle tailoring of FIGS. 13A and 13B.

FIG. 14A is a partial perspective view of an example embodiment of a composite-body fuselage shell 120 having a near-elliptical cross section, illustrating examples of the ply-angle tailorings of FIGS. 13A and 13B described above. Thus, in FIG. 14A, one set of steered fibers 122 has an angular orientation of A=5 degrees at about the crown 104 of the shell 120, which increases to an angular orientation of B=45 degrees at the two sides 102 and 106 of the shell, then decreases back to the initial value of 5 degrees at the keel 108 of the shell, as described above and illustrated in FIG. 13A. A second set of steered fibers 124 has an angular orientation of A=−85 degrees at about the crown 104 of the shell 120, which increases to an angular orientation of B=−45 degrees at the two sides 102 and 106 of the shell, then decreases back to −85 degrees at the keel 108 of the shell, as described above and illustrated in FIG. 13B. As may be seen from FIG. 14A, by steering the direction of the plies 122 and 124 so as to effectively react the periodically varying circumferential stresses and bending moments induced in the shell 120 by internal pressurization as a correspondingly periodic function of $\phi$, the resulting shell will be lighter in weight than a shell incorporating plies with conventional angular orientations and that is "over-designed" so as to react the peak or maximum stresses and moments in the shell.

Figure 14B:
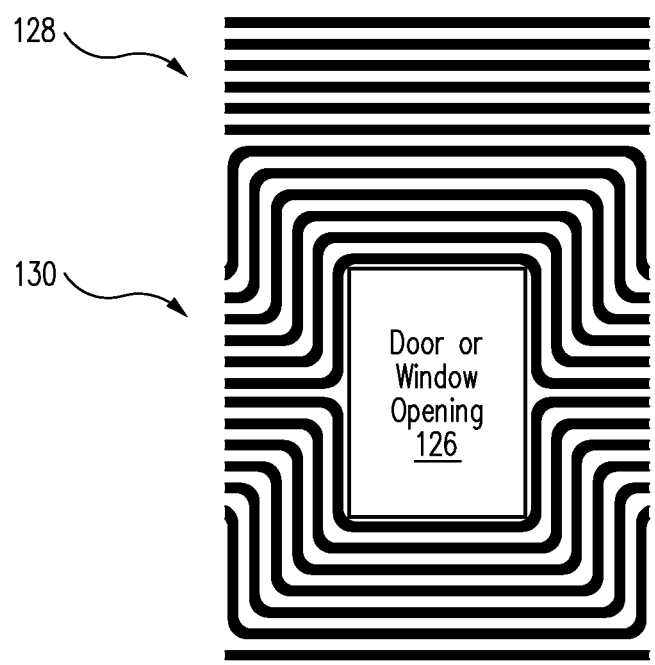
FIG. 14B is a partial plan view of an example embodiment of the tailoring of composite tape ply angles around a cutout, such as a door or window, in the shell of a composite-body fuselage having a near-elliptical cross section, in accordance with the present disclosure.

FIG. 14B is a partial plan view of an example embodiment of the tailoring of composite tape ply angles around a cutout 126, such as a door or window opening, in the shell of a composite-body fuselage having a near-elliptical cross section As illustrated in FIG. 14B, a set of 0 degree plies 128 is extended though areas of high longitudinal loads, e.g., along the floor-to-shell interface and at stow bin load induction points, and is tailored, i.e., "steered," to include off-axis plies 130, e.g., plies oriented at about ±90 degrees around the window opening 126.

Figure 15A:
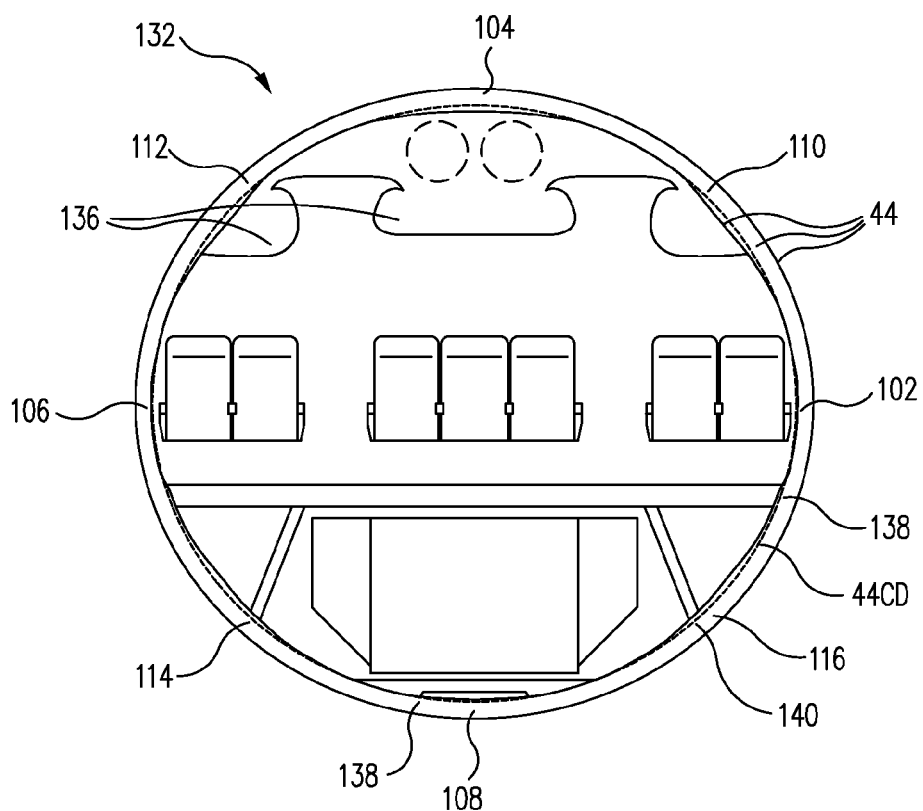
FIG. 15A is cross-sectional front end view of a circumferential frame of an example embodiment of a composite-body fuselage shell having a near-elliptical cross section, showing the tailoring of the radial thickness of the frame to effectively react the periodic pressurization-induced loads acting therein in accordance with the present disclosure.

FIG. 15A is a cross-sectional front end view of a circumferential frame 44 of an example embodiment of a near-elliptical composite-body fuselage shell 132, showing the tailoring of the depth or radial thickness of the frame as a function of selected values of the angular coordinate $\phi$ to effectively react the periodic pressurization-induced bending moments and circumferential loads acting therein. The tailoring of the depth or radial thickness of the illustrated circumferential frame 44 can be better understood when considered in relation to the inner mold line of a hypothetical untailored, constant-depth frame, which inner mold line is illustrated in FIG. 15A with dotted lines 44CD. In particular, as discussed above in connection with FIG. 10, the pressure-induced circumferential bending moments in the fuselage vary periodically with $\phi$, with minimum values occurring at the left side 104, crown 104, right side 106 and keel 108 of the shell 132, and with maximum values occurring at values of $\phi$ corresponding to about 45, 135, 225 and 325 degrees. Thus, as may be seen from FIG. 15A, by tailoring the frame 44 to increase its depth at the latter positions of $\phi$ and to decrease its depth at the former positions, the tailored frame 44 will be substantially lighter in weight than a conventional frame of a constant depth that is designed to react the peak bending moments in the shell 132.

Figure 15B:
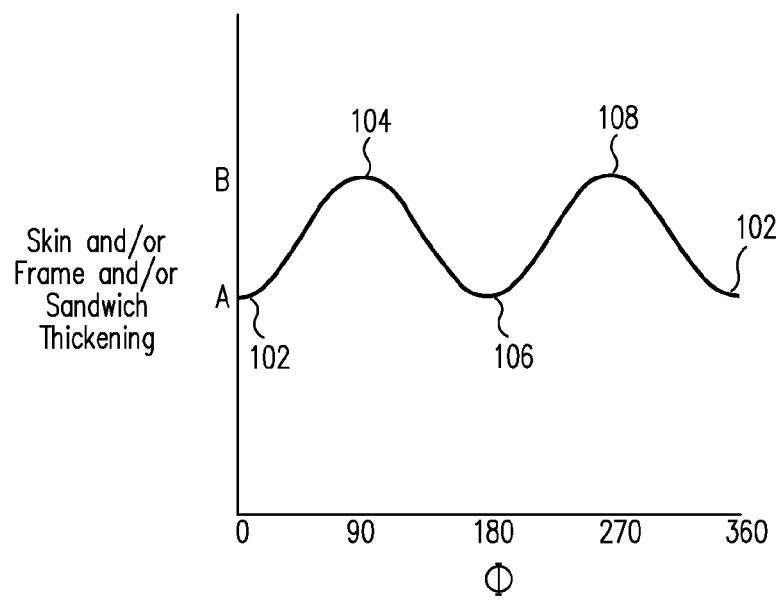
FIG. 15B is a graph illustrating the periodic tailoring of the radial thickness of the skin, frame and/or sandwich of the shell of a composite-body fuselage shell having a near-elliptical cross section to effectively react pressurization-induced circumferential tension loads in the shell as a function of the cylindrical angular coordinate $\phi$ in accordance with the present disclosure.
Figure 15C:
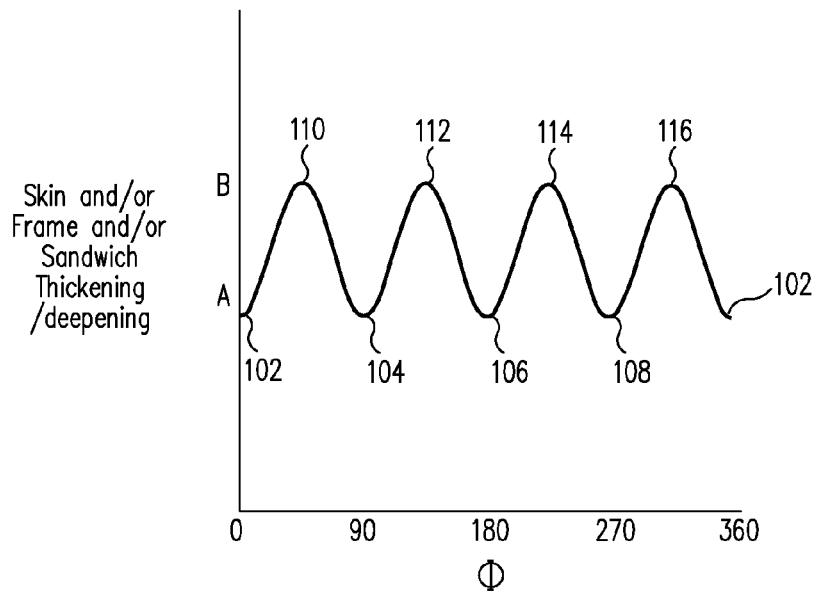
FIG. 15C is a graph illustrating the periodic tailoring of the radial thickness of the skin, frame and/or sandwich of the shell of a composite-body fuselage having a near-elliptical cross section to react pressurization-induced circumferential bending loads in the shell as a function of the cylindrical angular coordinate $\phi$ in accordance with the present disclosure; and, FIG. 16 is a front end cross-sectional view of an example embodiment of a composite-body fuselage shell having a near-elliptical cross section, showing the tailoring of structural attributes of the shell in selected areas to effectively react non-periodic body loads in the shell in accordance with the present disclosure.

FIGS. 15B and 15C are graphs respectively illustrating the periodic tailoring of the radial thickness of the skin, frame and/or sandwich of a near-elliptical cross section composite fuselage shell to effectively react pressurization-induced circumferential tension and bending loads in the shell as a function of the cylindrical angular coordinate $\phi$. As may be seen by a comparison of FIGS. 15B and 15C with FIGS. 13B and 13C, the periodic material thickness tailorings of the former are substantially similar to the periodic ply-direction tailorings of the latter, which, as discussed above, were respectively implemented to effectively react the same periodic, pressure-induced loads in the shell respectively illustrated in FIGS. 9 (with period ≈180 degrees) and 10 (with period ≈90 degrees), the difference between the two sets being the minimum and maximum values A and B of the structural attribute being tailored. As those of skill in the art will appreciate, this shows that the weight optimizing structural attribute tailorings of the present disclosure are complementary to each other, and that weight-saving tradeoffs can be made in terms of the structural attributes being tailored using, e.g., numerical min-max techniques, to arrive at fuselage shells that are optimum in terms of their weight-to-load-bearing capability ratio.

Figure 16:
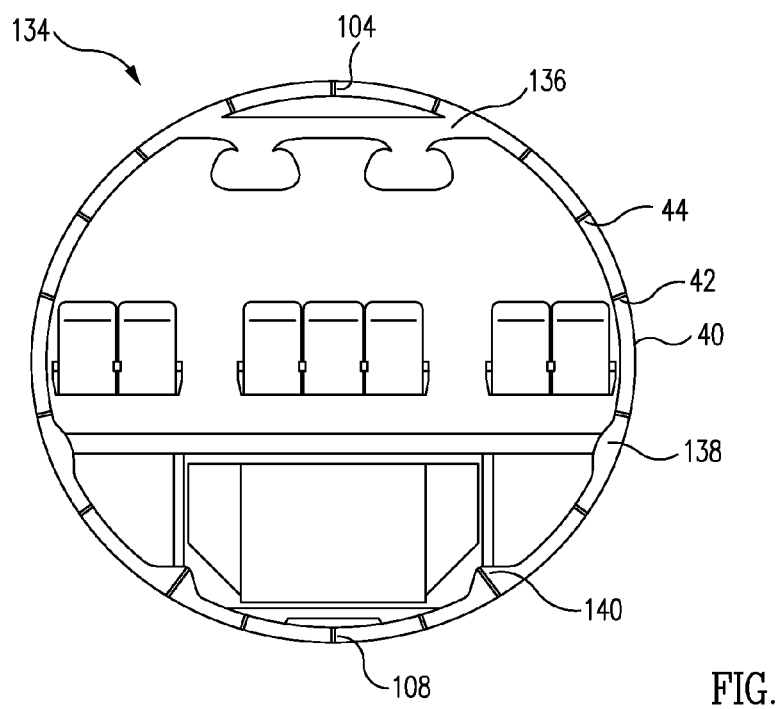

FIG. 16 is front end cross-sectional views of a near-elliptical composite-body fuselage shell 134 illustrating tailoring of one or more of the radial depth or thickness of the skin(s) 20, stringers 42, frames 44 and/or ply directions in selected areas of the shell to react non-periodic, i.e., non-pressurization-induced, loads in the shell. As illustrated in FIG. 16, the crown 104 and the keel 108 of the shell 134 are subject to non-periodic longitudinal bending and/or elevator-control-induced loads, and the baggage storage bins 136, the floor-to-shell and stanchion-to-shell interfaces 138 and 140 are all subject to non-periodic local weight or inertial loads. In accordance with the present disclosure, the same structural attribute tailoring techniques described above for effectively reacting the periodic pressurization-induce loads in the shell 134 may also be used to effectively react these non-periodic loads, e.g., by adjusting the thickness of the skin(s) 20, frames 44, stringers 42, number of plies and/or the ply directions at these particular locations of the shell, while simultaneously achieving a weight-optimized shell design.

By now, those of skill in this art will appreciate that many modifications, substitutions and variations can be made in and to the materials, apparatus, configurations and methods of weight optimization of the near-elliptical aircraft fuselage structures of the present disclosure without departing from its spirit and scope. Accordingly, the scope of the present disclosure should not be limited to the particular embodiments illustrated and described herein, as they are merely by way of example, but rather, should be fully commensurate with that of the claims appended hereafter and their functional equivalents.

What is claimed is:

1. A method for minimizing the weight of an internally pressurized aircraft fuselage of a type that includes an elongated tubular shell having a central axis x, opposite nose and tail ends, and a near-elliptical cross-section having a radius $R(\phi)$ at substantially every point along the x axis between the two ends, wherein:

$\phi$ is a roll elevation angle of the shell varying from 0 degrees to +360 degrees about the x axis;

$R(\phi)$ varies radially by no more than ±7% from a radius $r(\phi)$ of a true elliptical cross-section having a radius $r(\phi)$, a major axis of dimension $2 \cdot r_{max}$ and a minor axis of $2 \cdot r_{min}$, a curvature $Curv(\phi)$ of the shell is defined as the inverse of the local radius of curvature of a surface of the shell and is associated with $R(\phi)$, and a curvature $\kappa(\phi)$ of the true ellipse is given by:

$$\kappa(\varphi) = \frac{\left[r^2 + 2 \cdot \left(\frac{\partial r}{\partial \varphi}\right)^2 - r \cdot \frac{\partial^2 r}{\partial \varphi^2}\right]}{\left[r^2 + \left(\frac{\partial r}{\partial \varphi}\right)^2\right]^{1.5}},$$

the method comprising:

tailoring at least one structural attribute of the shell as a function of at least one of the elevation angle $\phi$, $R(\phi)$ and $Curv(\phi)$ so as to reduce the weight of the fuselage relative to an identical fuselage shell in which the same at least one structural attribute has not been so tailored, wherein the tailored function is periodic for $\phi$=0 to 360 degrees and has a period of 360/n degrees, n is an integer, and the tailored function includes at least two local extrema located within 15 degrees of the values of $\phi$ corresponding to a maximum $R(\phi)$ located near the major axis of the true elliptical cross-section.

2. The method of claim 1, wherein:

the shell comprises a circumferential skin having a thickness; and, the tailoring of the at least one structural attribute comprises tailoring the thickness of the skin as a function of at least one of $\phi$, $R(\phi)$ and $Curv(\phi)$.

3. The method of claim 2, wherein:

the circumferential skin comprises a multi-ply composite structure incorporating at least one of non-metallic and metallic materials;

each ply is oriented at a selected angle relative to the other plies; and, the tailoring of the at least one structural attribute further comprises tailoring the plies with respect to at least one of the number of plies, the angular orientation of at least one of the plies, and the material of the plies.

4. The method of claim 1, wherein:

the shell comprises a plurality of generally parallel, longitudinally spaced circumferential frames; and, the tailoring of the at least one structural attribute comprises tailoring a radial depth of the frames as a function of at least one of $\phi$, $R(\phi)$ and $Curv(\phi)$.

5. The method of claim 4, wherein:

each circumferential flange comprises at least one of an inner and an outer circumferential flange; and, the tailoring of the at least one structural attribute further comprises tailoring a radial depth of the flange substantially as a function of at least one of $\phi$, $R(\phi)$ and $Curv(\phi)$.

6. The method of claim 4, wherein:

each circumferential frame comprises a radial web; and, the tailoring of the at least one structural attribute further comprises tailoring a thickness of the web as a function of at least one of $\phi$, $R(\phi)$ and $Curv(\phi)$.

7. The method of claim 6, wherein:

the thicknesses of the webs are variable in a radial direction; and, the tailoring of the at least one structural attribute further comprises tailoring the radial distribution of the web thicknesses as a function of at least one of $\phi$, $R(\phi)$ and $Curv(\phi)$.

8. The method of claim 4, wherein:

each circumferential frame comprises a multi-ply composite structure made of at least one of non-metallic and metallic materials;

each ply is oriented at a selected angular orientation relative to the other plies; and, the tailoring the at least one structural attribute further comprises tailoring the plies with respect to at least one of the number of plies, the relative angular orientation of the plies, and the material of the plies.

9. An aircraft, comprising:

a fuselage, including an elongated internally pressurized tubular shell having a centerline axis, opposite closed nose and tail ends, and a near-elliptical cross-section having a radius $R(\phi)$, where $\phi$ is an elevation angle defined by an angular coordinate of a cylindrical coordinate system concentric with the centerline axis, a curvature $Curv(\phi)$, where $Curv(\phi)$ is the inverse of a local radius of curvature of a surface of the shell, and a circumference that varies radially by no more than ±7% from the circumference of a true elliptical cross-section at substantially every position along the centerline axis between the nose and tail ends thereof, wherein:

the shell of the fuselage includes at least one structural attribute that has been tailored as a function of at least one of the elevation angle ϕ, R(ϕ) and Curv(ϕ) so as to reduce the weight of the fuselage relative to an identical fuselage shell in which the same at least one structural attribute has not been so tailored, the tailoring function is periodic for ϕ=0 to 360 degrees, with a period of 360/n degrees, n is an integer, and the tailored function includes at least two local extrema located within 15 degrees of the values of ϕ corresponding to a maximum R(ϕ) located near the major axis of the true elliptical cross-section.

10. The aircraft of claim 9, wherein:

the shell comprises a circumferential outer skin and circumferentially spaced longitudinal stringers disposed adjacent to an inner surface of the skin; and, the at least one tailored structural attribute comprises at least one of a cross-sectional shape and size, number, and material of the stringers.

11. The aircraft of claim 10, wherein:

each of at least one of the circumferential skin and the stringers comprises a composite of a plurality of plies, each having a selected angular orientation relative to the others; and, the at least one tailored structural attribute comprises at least one of the number, relative angular orientation, and material of the plies.

12. The aircraft of claim 9, wherein:

the shell comprises a sandwich structure including a circumferential outer skin attached to a rigid core of at least one of a foam material and a plurality of rigid, interconnected cells; and, the at least one tailored structural attribute comprises at least one of a thickness of the outer skin, a thickness of the core, a core cell density and a core material.

13. The aircraft of claim 9, wherein:

the shell comprises an isogrid structure having at least one external face sheet attached to a grid comprising internal stiffening members; and, the at least one tailored structural attribute comprises at least one of grid spacing, grid thickness, grid geometry, grid material, face sheet thickness and face sheet material.

14. The aircraft of claim 9, wherein the shell comprises a filament-wound structure.

15. The aircraft of claim 9, wherein the shell comprises a tape-laid composite structure.

16. The aircraft of claim 9, wherein the shell comprises at least one of an autoclave-cured composite structure, a microwave-cured composite structure and an E-beam cured composite structure.

17. The aircraft of claim 9, wherein the shell includes at least one of a carbon-fiber-in-resin composite structure and a combination of composite and metallic materials.

18. The aircraft of claim 9, wherein the shell includes at least one of stitched multiply composite structure, a stitched resin-film-infused (RFI) composite structure and a stapled multiply composite structure.

19. The aircraft of claim 9, wherein the shell comprises a composite structure including electrically conductive elements for mitigating at least one of electromagnetic effects (EME) and lightning effects acting upon the aircraft.

20. The aircraft of claim 9, wherein the shell comprises a composite structure having an outer surface with a colored, electrically conductive riblet film disposed thereon for providing a decorative color, reduced aerodynamic drag, and mitigation of lightning and electromagnetic effects (EME) acting the aircraft.

21. The aircraft of claim 9, wherein the shell comprises a composite skin having some longitudinally oriented fiber plies having an orientation of zero degrees, plus or minus 20 degrees, relative to a local fuselage surface axis system, and other plies wound circumferentially around the shell and having orientations varying within a range of 90 degrees, plus or minus 20 degrees, relative to the local fuselage surface axis system.

22. The aircraft of claim 21, wherein the shell further comprises first angled plies having orientations varying within a range of +45 degrees, plus or minus 20 degrees, relative to the local fuselage surface axis system, and second angled plies with orientations varying within in a range of −45 degrees, plus or minus 20 degrees, relative the local fuselage surface axis system.

23. The aircraft of claim 22, wherein the angular orientations of the first and second angled plies vary periodically between selected angular values in correspondence with periodically varying pressure-induced circumferential loads in the shell.

24. The aircraft of claim 22, wherein the first and second angled plies are laid down around the shell during its construction along steered paths such that the magnitude of their respective orientations vary relative to 45 degrees for regions of ϕ wherein longitudinal loads incident on the shell exceed circumferential loads incident on the shell by a selected amount.

25. The aircraft of claim 21, wherein additional longitudinal plies having orientations in a range of zero degrees, plus or minus 20 degrees relative to the local fuselage surface axis system are placed in at least one of a crown and a keel region of the fuselage during its construction for efficiently reacting fuselage bending moments induced by at least one of horizontal tail loads, elevator loads and nose gear slapdown loads incident thereon.

26. The aircraft of claim 9, further comprising at least one additional composite ply layer in a crown region of the shell for reducing a risk of hail damage in the fuselage crown area.

27. The aircraft of claim 9, further comprising at least one additional composite ply layer in a window belt area of upper sides of the shell.

* * * * *